US012785393B2

(12) United States Patent
Takac et al.

(10) Patent No.: US 12,785,393 B2
(45) **Date of Patent: *Nov. 3, 2026**

(54) METHOD FOR GRID LOAD BALANCING AND ENHANCED RENEWABLE ENERGY USE IN CLIMATE CONTROL APPLICATIONS

(71) Applicant: Mohamed bin Zayed University of Artificial Intelligence, Abu Dhabi (AE)

(72) Inventors: Martin Takac, Abu Dhabi (AE); Mohannad Takrouri, Abu Dhabi (AE); Nicolas Avila, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 0 days.

This patent is subject to a terminal disclaimer.

(21) Appl. No.: 19/529,843

(22) Filed: Feb. 4, 2026

(65) Prior Publication Data

US 2026/0171802 A1 Jun. 18, 2026

Related U.S. Application Data

(63) Continuation of application No. 19/179,677, filed on Apr. 15, 2025.

(60) Provisional application No. 63/634,070, filed on Apr. 15, 2024.

(51) Int. Cl.

| | |
|---|---|
| ***H02J 3/00*** | (2026.01) |
| ***F24F 11/46*** | (2018.01) |
| ***H02J 3/28*** | (2006.01) |
| ***H02J 3/38*** | (2006.01) |
| *H02J 101/20* | (2026.01) |
| *H02J 103/30* | (2026.01) |

(52) U.S. Cl.

CPC .............. *H02J 3/003* (2020.01); *F24F 11/46* (2018.01); *H02J 3/004* (2020.01); *H02J 3/28* (2013.01); *H02J 3/381* (2013.01); *H02J 2101/20* (2026.01); *H02J 2103/30* (2026.01)

(58) Field of Classification Search

CPC ............... H02J 3/003; H02J 3/004; H02J 3/28

See application file for complete search history.

(56) References Cited

U.S. PATENT DOCUMENTS

2019/0361412 A1* 11/2019 Park ...................... G06F 16/288
2022/0146136 A1* 5/2022 Ba .......................... G05B 15/02

(Continued)

*Primary Examiner* — Vincent H Tran

(74) *Attorney, Agent, or Firm* — Oblon, McClelland, Maier & Neustadt, L.L.P.

(57) ABSTRACT

A method of determining a management strategy and implementing core actions for a cooling system includes obtaining data stream data, including at least one of a weather data stream, a power grid data stream, a social network data stream, a satellite data stream, and a climate model data stream; obtaining historical data including at least one of historical weather data, historical power grid data, historical social network data, historical satellite data, and historical climate model data; determining features from the data stream data and the historical data to generate collected feature data; determining patterns from the collected feature data to generate pattern data; generating policy data including candidate setpoints; determining a set of actions based on the policy data; and transmitting the set of actions and the candidate setpoints.

20 Claims, 21 Drawing Sheets

(56) References Cited

U.S. PATENT DOCUMENTS

| | | | | |
|---|---|---|---|---|
| 2023/0152035 | A1* | 5/2023 | Jackson | F25D 29/00<br>700/297 |
| 2024/0019213 | A1* | 1/2024 | Rousselet | F28C 1/02 |
| 2024/0329610 | A1* | 10/2024 | Huber | G06N 7/01 |

* cited by examiner

815

METHOD FOR GRID LOAD BALANCING AND ENHANCED RENEWABLE ENERGY USE IN CLIMATE CONTROL APPLICATIONS

CROSS-REFERENCE TO RELATED APPLICATIONS

This application is a continuation of and claims benefit to U.S. patent application Ser. No. 19/179,677, filed Apr. 15, 2025, and claims priority to U.S. Provisional Application No. 63/634,070, filed Apr. 15, 2024, the entire content of which is incorporated by reference herein in its entirety for all purposes.

BACKGROUND

Technical Field

The present disclosure is directed to a method for addressing the unpredictability of renewable energy generation and stochastic energy demand.

Description of the Related Art

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The escalating integration of renewable energy sources has prompted heightened interest in optimizing charging and discharge operations. See Samir Touzani, Anand Krishnan Prakash, Zhe Wang, Shreya Agarwal, Marco Pritoni, Mariam Kiran, Richard Brown, and Jessica Granderson. Controlling distributed energy resources via deep reinforcement learning for load flexibility and energy efficiency. *Applied Energy,* 304:117733, 2021; Paulo Lissa, Conor Deane, Michael Schukat, Federico Seri, Marcus Keane, and Enda Barrett. Deep reinforcement learning for home energy management system control. *Energy and AI,* 3:100043, 2021; and Taha Abdelhalim Nakabi and Pekka Toivanen. Deep reinforcement learning for energy management in a microgrid with flexible demand. *Sustainable Energy, Grids and Networks,* 25:100413, 2021. Distributed energy resources (DERs), such as building-integrated solar photovoltaic (PV) systems and electric battery storage, are emerging as pivotal enhancements to grid reliability, resilience, and carbon reduction efforts. See Samir Touzani, Anand Krishnan Prakash, Zhe Wang, Shreya Agarwal, Marco Pritoni, Mariam Kiran, Richard Brown, and Jessica Granderson. Controlling distributed energy resources via deep reinforcement learning for load flexibility and energy efficiency. Applied Energy, 304:117733, 2021.

In the context of energy storage, within the smart grid infrastructure, energy storage devices are indispensable. Batteries, for instance, can quickly adapt to variations in renewable energy production or disturbances within the grid. Similarly, thermal storage tanks, designed to store large amounts of phase-change material like ice, play a crucial role. These tanks initiate freezing during off-peak times or when energy prices are lowest, transforming the phase-change material into ice and sequestering a substantial cooling potential. Consequently, the cooling cost can be notably reduced by converting low-cost electrical energy into ice storage. See Harri Aaltonen, Seppo Sierla, Rakshith Subramanya, and Valeriy Vyatkin. A simulation environment for training a reinforcement learning agent trading a battery storage. *Energies,* 14(17), 2021. When demand surges during peak periods, this stored cooling energy is deployed to satisfy extensive cooling requirements in homes.

However, district cooling energy plants grapple with the high electricity consumption and the computational complexities involved in operating chillers and managing the charging and discharging of thermal energy storage (TES) systems. See Zhong Guo, Austin R. Coffman, and Prabir Barooah. Reinforcement learning for optimal control of a district cooling energy plant, 2022. Furthermore, during peak hours, especially in the summer, the city's power grid bears an immense load due to the high demand for cooling, which notably diminishes at night, leading to surplus energy capacity that could be strategically leveraged. See Yili Zhang, Sean Kissick, and Hailei Wang. Modeling and Simulation of Building Cooling System With Supercooling-Based Ice Energy Storage. *ASME Journal of Engineering for Sustainable Buildings and Cities,* 1(2):021002, 04 2020. This disparity has culminated in the implementation of time-of-use electricity rates by many utility companies, which, in turn, has escalated electricity costs for customers with significant cooling demands.

Reinforcement Learning (RL) has been identified as a potent methodology for formulating effective strategies for operating such systems. Its applications span from optimizing solar panel charging to enhancing the efficiency of wind turbine generators. See Touzani, et al.; Lissa et al.; Nakabi et al.; Aaltonen et al.; Ohoud Almughram, Sami Abdullah ben Slama, and Bassam A. Zafar. A reinforcement learning approach for integrating an intelligent home energy management system with a vehicle-to-home unit. *Applied Sciences,* 13(9), 2023; Liang Yu, Shuqi Qin, Meng Zhang, Chao Shen, Tao Jiang, and Xiaohong Guan. A review of deep reinforcement learning for smart building energy management. *IEEE Internet of Things Journal,* 8(15):12046-12063, 2021; Huiliang Zhang, Di Wu, and Benoit Boulet. A review of recent advances on reinforcement learning for smart home energy management. In 2020 *IEEE Electric Power and Energy Conference* (*EPEC*), pages 1-6, 2020. RL has also been employed to refine the scheduling of TES and chillers, capitalizing on the fluctuating electricity prices to improve cost-efficiency. See Zhong Guo, Austin R. Coffman, and Prabir Barooah. Reinforcement learning for optimal control of a district cooling energy plant, 2022.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The present disclosure is related to a method, including obtaining data stream data including at least one of a weather data stream, a power grid data stream, a social network data stream, a satellite data stream, and a climate model data stream; obtaining historical data including at least one of historical weather data, historical power grid data, historical social network data, historical satellite data, and historical climate model data; determining features from the data stream data and the historical data to generate collected feature data; determining patterns from the collected feature data to generate pattern data; generating policy data including candidate setpoints; determining a set of actions based on the policy data; and transmitting the set of actions and the candidate setpoints.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
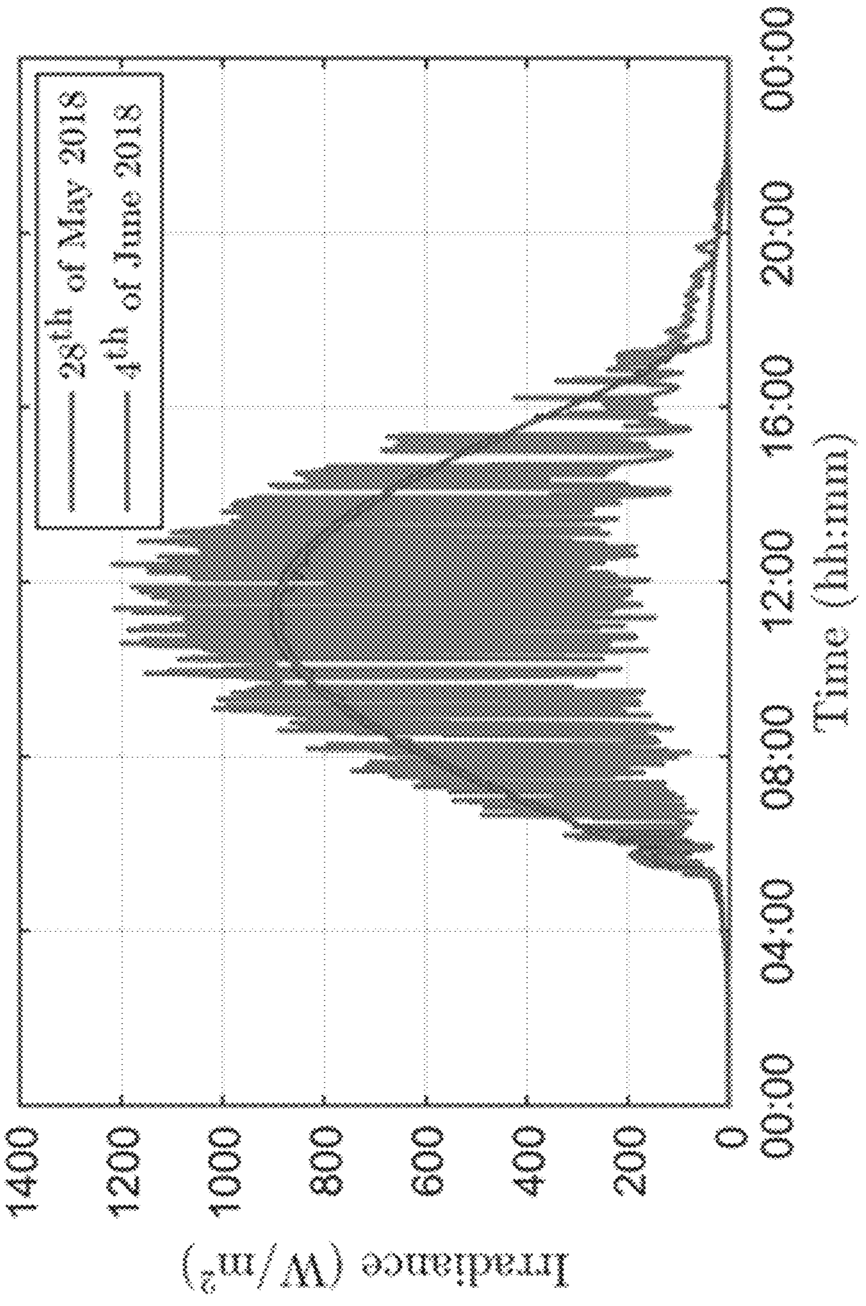
FIG. 1 is a graph illustrating the irradiance profiles on clear-sky and partly cloudy days on the 28 May 2018 and the 4 Jun. 2018.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

The recent ambitions of many countries to reduce fossil fuel consumption have underscored the desire to harness renewable energy sources. A primary challenge associated with renewable energy sources lies in the uncertainty of power generation. The output from renewable energy sources varies based on numerous factors, including the day of the year and weather conditions. Similarly, energy demand is highly variable, stemming from industrial, household, and other needs. To prevent potential blackouts, the energy generated by all sources must surpass the total demand within a power grid at any time. Typically, this can be managed or mitigated by forecasting expected energy demand and production from renewable sources. Fossil fuel-based power plants adjust their output to fill gaps, including a safety margin. While effective in preventing shortages, this approach leads to inefficiencies in the overall power grid. Thus, described herein is a method to address the challenges of the unpredictability of renewable energy generation and stochastic energy demand while increasing power grid efficiency and reducing carbon emissions.

To this end, FIG. 1 illustrates irradiance profiles for two distinct days, according to an embodiment of the present disclosure. In an embodiment, as shown, one day (labeled as May 28, 2018) can be a relatively sunny day with minimal cloud coverage, and a second day (labeled as Jun. 4, 2018) can demonstrate irradiance levels during cloudy conditions with volatile irradiance levels. As illustrated in FIG. 1, irradiance derived from renewable energy sources can be highly volatile based on various conditions, making it challenging to predict a resulting power output. To maintain the energy balance between generated power and load, specific agents or systems in a power grid can be designated to have a controllable demand. This enables quick adjustments to a target system's load to achieve balance. For example, the charging of a large-capacity battery can be halted if the battery is in the process of being charged via other sources.

However, a disadvantage of traditional batteries can stem from their capacity degradation after thousands of charge and discharge cycles.

A more promising energy storage technology, particularly suitable for Gulf countries, is ice-based battery storage. The ice-based battery storage technology converts electrical energy into thermal energy (a cold medium), which can later be used in district cooling facilities to support, for example, air conditioning. The ice-based battery system delivers a unique synergy of energy efficiency, precise cooling management, and substantial cost-effectiveness, positioning it as a significant advancement in district cooling technologies. Furthermore, compared to batteries with cells that can have degraded capacity over time, the ice-based battery system does not suffer from the same issue.

The system provides the ability to accumulate cooling capacity during off-peak hours, releasing or using it when needed. This strategic management of resources leads to energy savings and reduces operational costs. The system dynamically adapts to shifting cooling demands. The system can vary in response to energy tariffs or changes in energy production from renewable sources, marking a progressive step towards more sustainable cooling practices.

Furthermore, the integration of the system with the energy grid facilitates the increased efficiency of cooling delivery. The system actively adjusts to real-time fluctuations in energy prices, demand patterns, and environmental factors to ensure the most economical and energy-efficient operation. Consequently, the energy grid benefits from a cooling solution with maximum efficiency for air conditioning needs, which also leads to financial savings and environmental benefits while maintaining indoor comfort levels.

Thus, the method described herein addresses these issues by integrating artificial intelligence (AI), energy storage as ice batteries, and demand-responsive control. Ice batteries offer a more economical energy storage solution than traditional methods, capitalizing on the ability to store excess energy, particularly from renewable but intermittent sources such as solar and wind. By leveraging AI, the method and system predict end-user demand and align with the variable generation rates of renewables, maximizing the efficiency of timing and quantity of stored energy for later use. The method also accounts for the impact of weather conditions on both the expected power generated from renewable sources and the effect of weather on energy storage devices. The method's comprehensive strategy ensures that the supply of cooling is managed proactively, thereby reducing energy waste and providing a buffer against the unpredictability of renewable energy generation. By leveraging latent thermal storage during diminished energy demand and judiciously releasing stored cooling at peak necessity, the system achieves a harmonious equilibrium between energy utilization and cooling needs.

Figure 2:
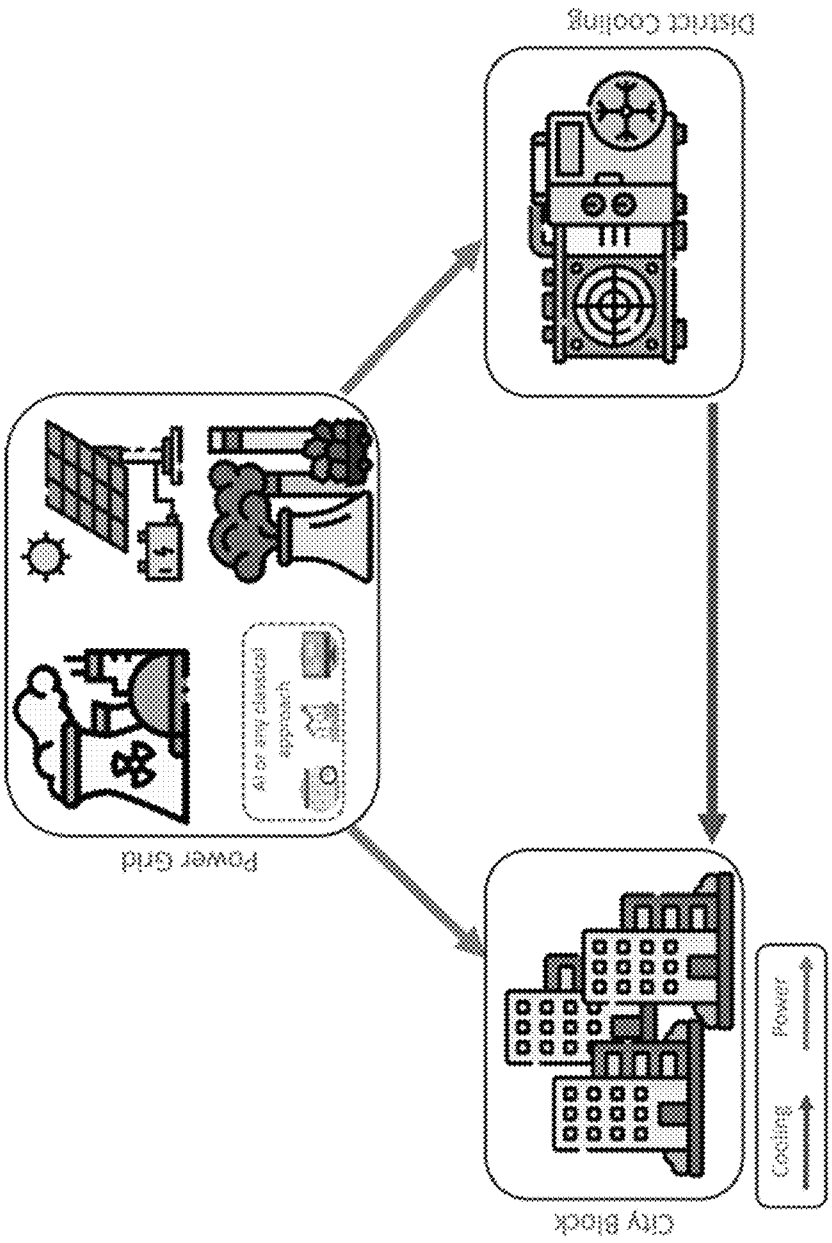
FIG. 2 illustrates the conventional energy management system without the integration of Artificial Intelligence (AI) technologies.

FIG. 2 illustrates a conventional energy management system where energy produced from nuclear, fossil, and solar sources is supplied to the power grid without the intermediary of sophisticated AI technologies. The energy is then distributed to the city block for electricity and to the district cooling system for managing temperature controls. This system operates on a more static and less efficient framework, relying on pre-established protocols and lacking the dynamic adaptability provided by AI. This system illustrates the standard approach to energy distribution, which may not fully capitalize on the potential efficiencies offered by more advanced, intelligent systems.

Figure 3:
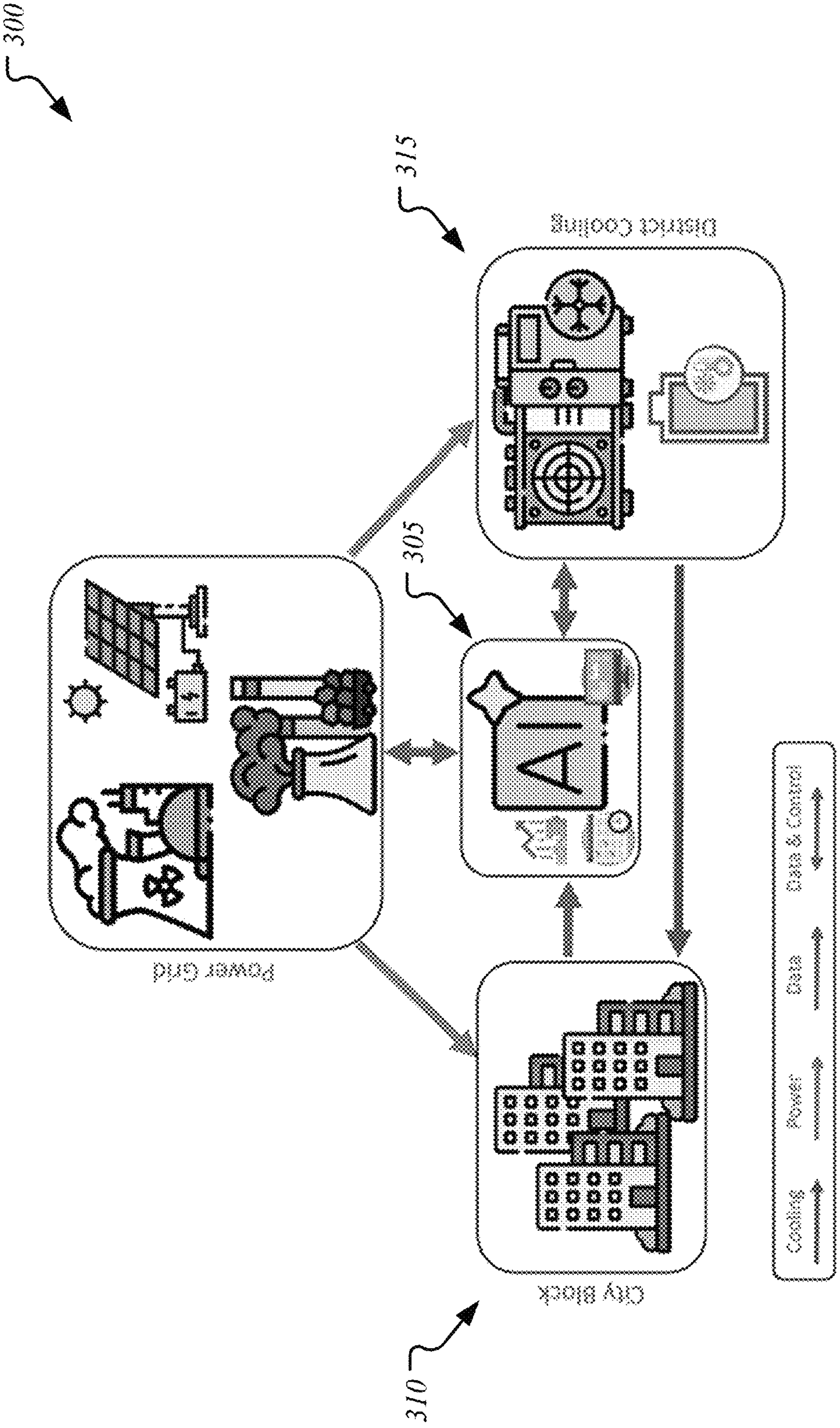
FIG. 3 illustrates the advanced energy management system integrating Artificial Intelligence (AI), according to an embodiment of the present disclosure.

To this end, FIG. 3 illustrates an energy management system 300 (referred to herein also simply as "the system 300") integrating an AI controller 305 (referred to herein also simply as "the AI 305"), according to an embodiment of the present disclosure. In an embodiment, energy from diverse sources such as nuclear power, fossil fuels, and solar panels can be efficiently distributed to the power grid. The AI 305 can perform a pivotal role in analyzing data and controlling energy distribution. The system 300 directs energy to a city block 310 and a district cooling facility 315, ensuring efficient power utilization for cooling and other electricity needs. The AI 305 uses complex algorithms and real-time data streams to increase efficiency for energy flow, minimize waste, and reduce costs.

In an embodiment, the method and system 300 can use a model that includes a city and a cooling system, both of which use energy consumption characterized as negative loads. Correspondingly, the energy generation facets of the model can be represented through solar, nuclear, and fossil fuel sources, each contributing positive loads to a total energy budget of the system 300.

The method and the system 300 can include two distinct batteries: a grid electric battery and a district cooling ice battery. The batteries can serve multiple functionalities, such as possessing the capacity to either charge or discharge based on the system's instantaneous energy requirements. The batteries can also provide energy availability for the case of the power grid and the instantaneous cooling requirements (which can be seen as the energy needed to generate the required cooling demand). The batteries can also provide availability for the case of a district cooling system. The energy requirements are denoted by positive or negative load values.

Notably, unlike conventional batteries, the energy stored in the ice-based battery storage (also referred to herein as "ice battery"), once converted into the cooling load, can be exclusively allocated to meet the cooling demands of the city. Hence, its charged energy cannot be repurposed to assist the grid in fulfilling electric demand, underscoring the specialized function and constraints associated with ice battery utilization.

Fixed costs are associated with each energy source: solar energy, nuclear energy, and fossil fuel energy. These values can significantly weigh the economic considerations of the system 300's energy distribution method and strategies.

Regarding operational logic, a hierarchy in energy utilization can be assumed where solar and nuclear energies are prioritized, reflecting lower associated costs and potentially lesser environmental impact than fossil fuel. In scenarios where renewable and nuclear sources generate surplus energy, a sequential charging protocol can be enacted, primarily targeting the grid battery and, subsequently, the cooling battery, contingent upon the persistence of surplus energy. Conversely, should the demand escalate beyond the available solar and nuclear energy provision, the system resorts to battery discharges, predominantly from the grid battery, to reconcile the demand-supply disparity.

The model can assume a constant cost for the fossil fuel, notwithstanding the recognition that real-world pricing could exhibit temporal variability. However, a constant cost is posited for analytical tractability and model simplicity, which subsequently informs the comparative evaluation of energy sourcing during deficit periods.

The procedural framework of the system iteratively assesses the combined output from solar and nuclear sources against the aggregate load demand. Excess energy is preferentially allocated towards battery charging, optimizing the system's readiness for subsequent demand surges. Conversely, in the event of energy inadequacy, the system strategically discharges the grid battery, supplemented by fossil fuel utilization, to ensure demand fulfillment, thereby delineating a cost-minimization strategy that concurrently accommodates load requirements and operational efficiency.

The operation of the system can be broken down into two phases: Off-Peak Energy Storage and On-Demand Cooling. For Off-Peak Energy Storage, during off-peak hours or when energy costs are at their lowest, the system 300 charges the energy storage device. For On-Demand Cooling, the system releases cooling on demand when cooling is required. The system efficiently utilizes the stored cooling capacity, ensuring precise temperature control.

Notably, the AI 305 is not solely a Reinforcement Learning (RL) model that determines control but comprises multiple components. However, the AI 305 can bridge the gap between reality and the models. The system 300 also employs various operations research (OR) techniques. Additionally, the AI 305 can analyze extensive usage data from industry and consumers, incorporating weather and grid features to assess energy generation and demand better. The analysis can include socio-economic factors, news, social media, and other relevant data sources.

Figure 4:
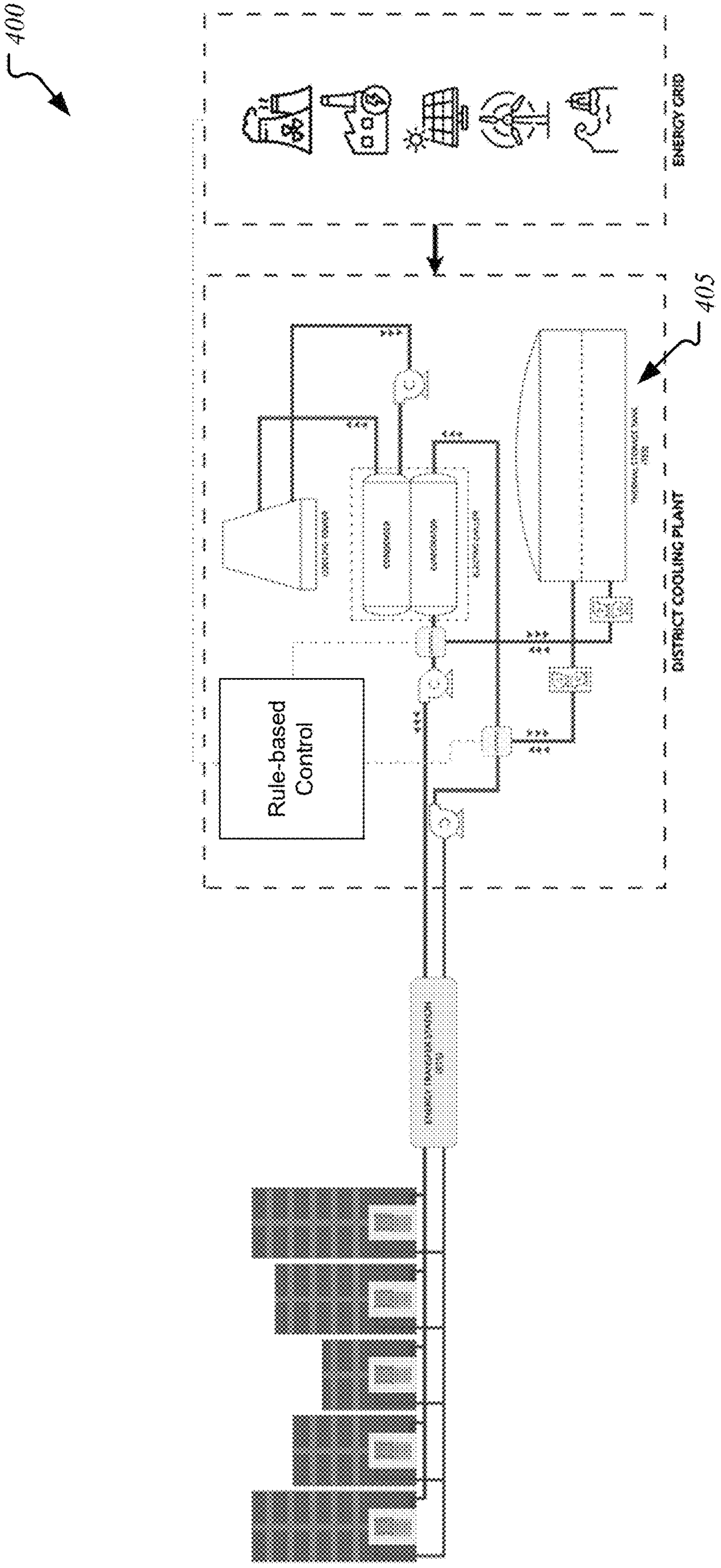
FIG. 4 illustrates a conventional cooling district rule-based control.

FIG. 4 is a schematic for a district cooling system 400 with a thermal storage tank, according to an embodiment of the present disclosure. In an embodiment, the district cooling system uses a central chiller plant to produce chilled water (or another cooling fluid) that is then circulated to multiple buildings for air conditioning. When a thermal storage tank 405 is used in the district cooling system 400 (herein referred to as "the system 400"), the system 400 chills a large volume of water during off-peak times (e.g., at night when electricity can be cheaper). The chilled water is stored in an insulated tank and then circulated during peak demand, reducing the need to run chillers at maximum capacity. The system 400 provides a solution with lower equipment complexity but uses more physical space since water holds less cooling energy per unit volume than other mediums, such as ice.

Figure 5:
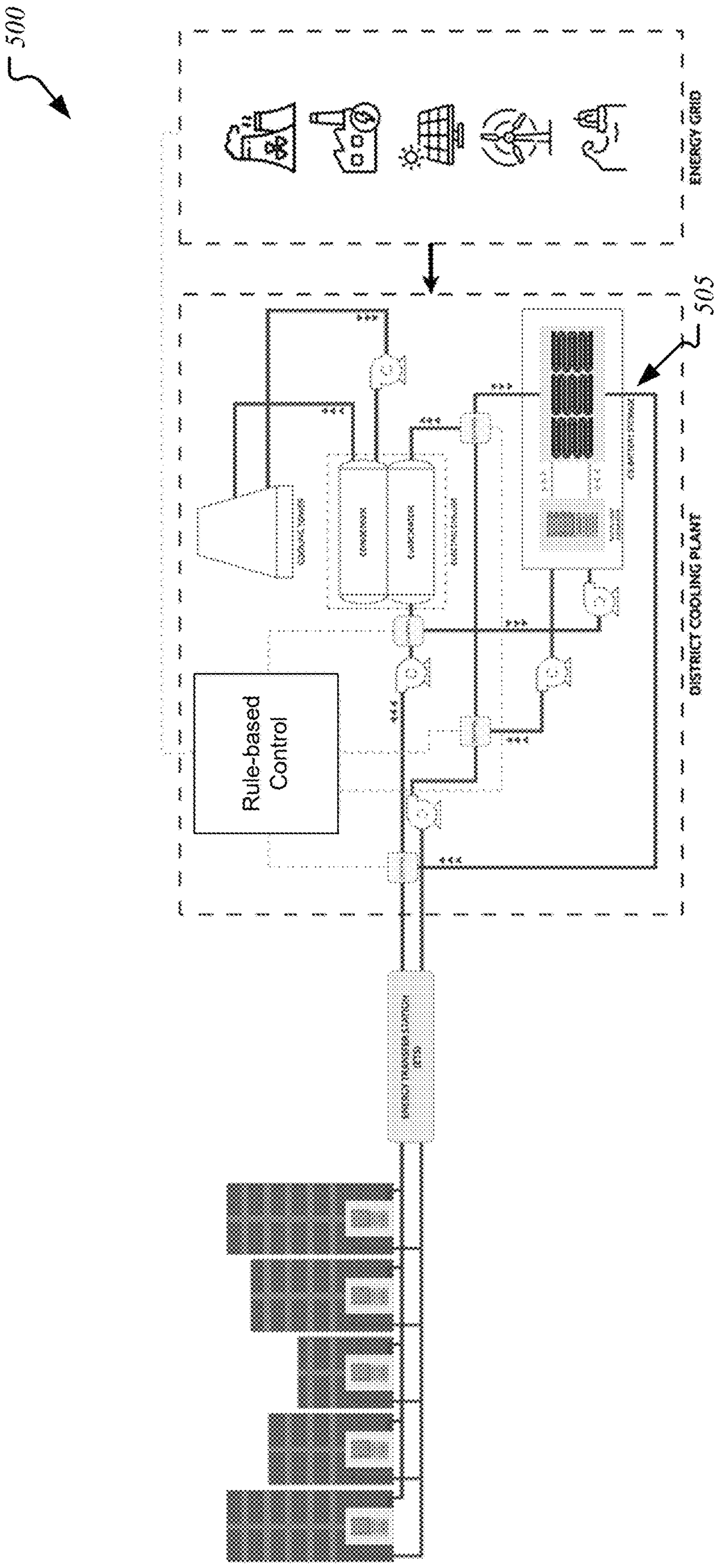
FIG. 5 illustrates an ice cooling district rule-based control.

FIG. 5 is a schematic for a district cooling system 500 with an ice battery according to an embodiment of the present disclosure. In an embodiment, the district cooling system 500 (herein referred to as "the system 500") freezes water into ice, which can be performed typically during off-peak hours. The ice is stored in specialized tanks (an ice-based battery storage 505) and then melted during peak cooling demand to provide chilled water. Because ice stores energy in latent heat of fusion of the ice, the ice-based battery can deliver a higher cooling density in a smaller volume. Although the system 500 can involve a higher upfront equipment cost and slightly more operational complexity, the system 500 can be very efficient for space-limited sites and for shifting peak electricity use.

Management of the system 400 and the system 500 can often use a rule-based control strategy where predefined schedules and thresholds dictate when to operate chillers, charge storage, or switch to storage discharge. For example, the system 400 and the system 500 can start charging the chilled water or ice storage at night once outdoor temperatures drop and electricity rates are lower and then switch to storage discharge during daytime peak periods based on a set time or temperature limit. While this approach is straightforward, the management method may not fully optimize energy use or respond dynamically to real-time conditions, potentially leading to inefficiencies compared to more advanced or adaptive control methods.

Figure 6:
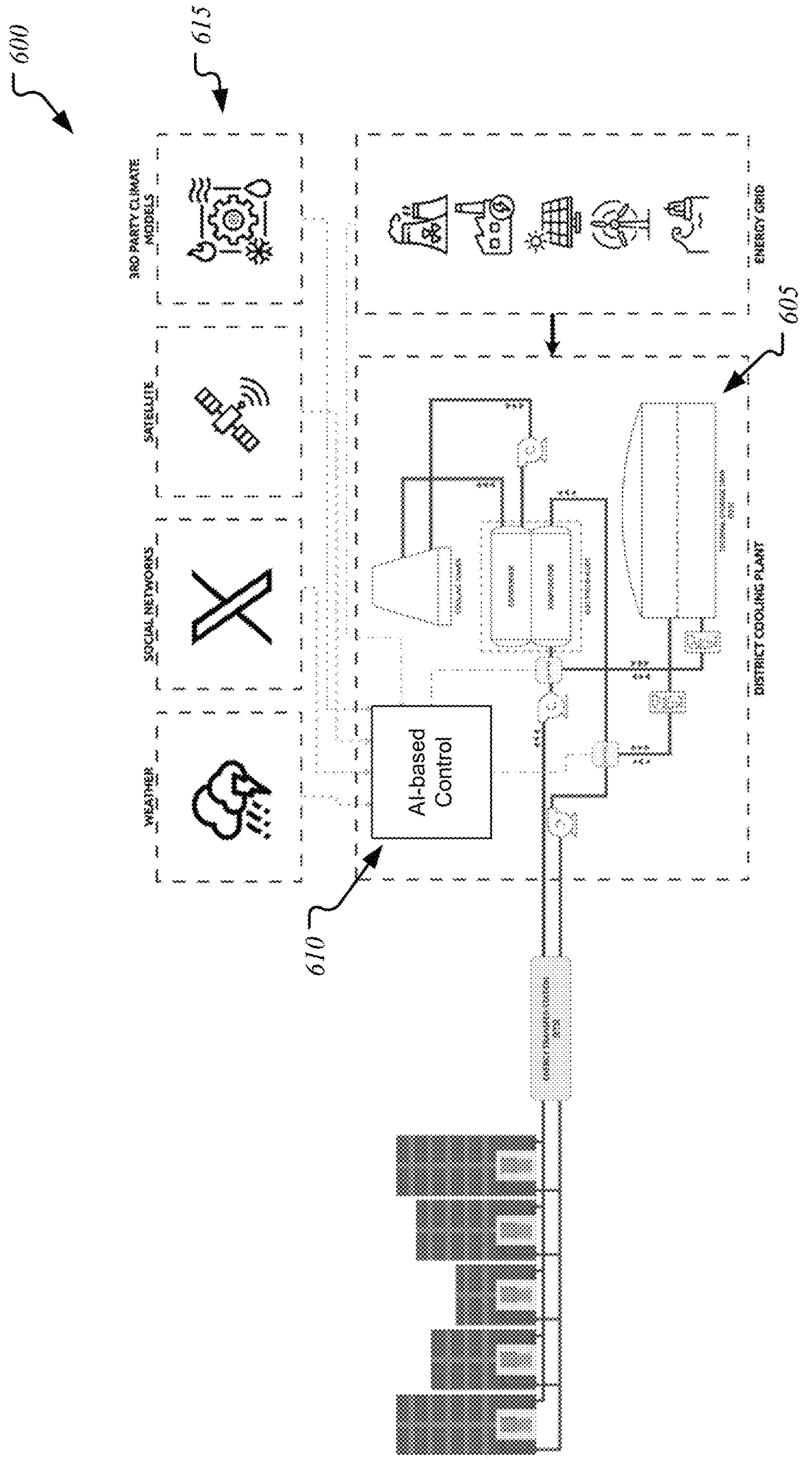
FIG. 6 illustrates a conventional cooling district AI-based control, according to an embodiment of the present disclosure.
Figure 9A:
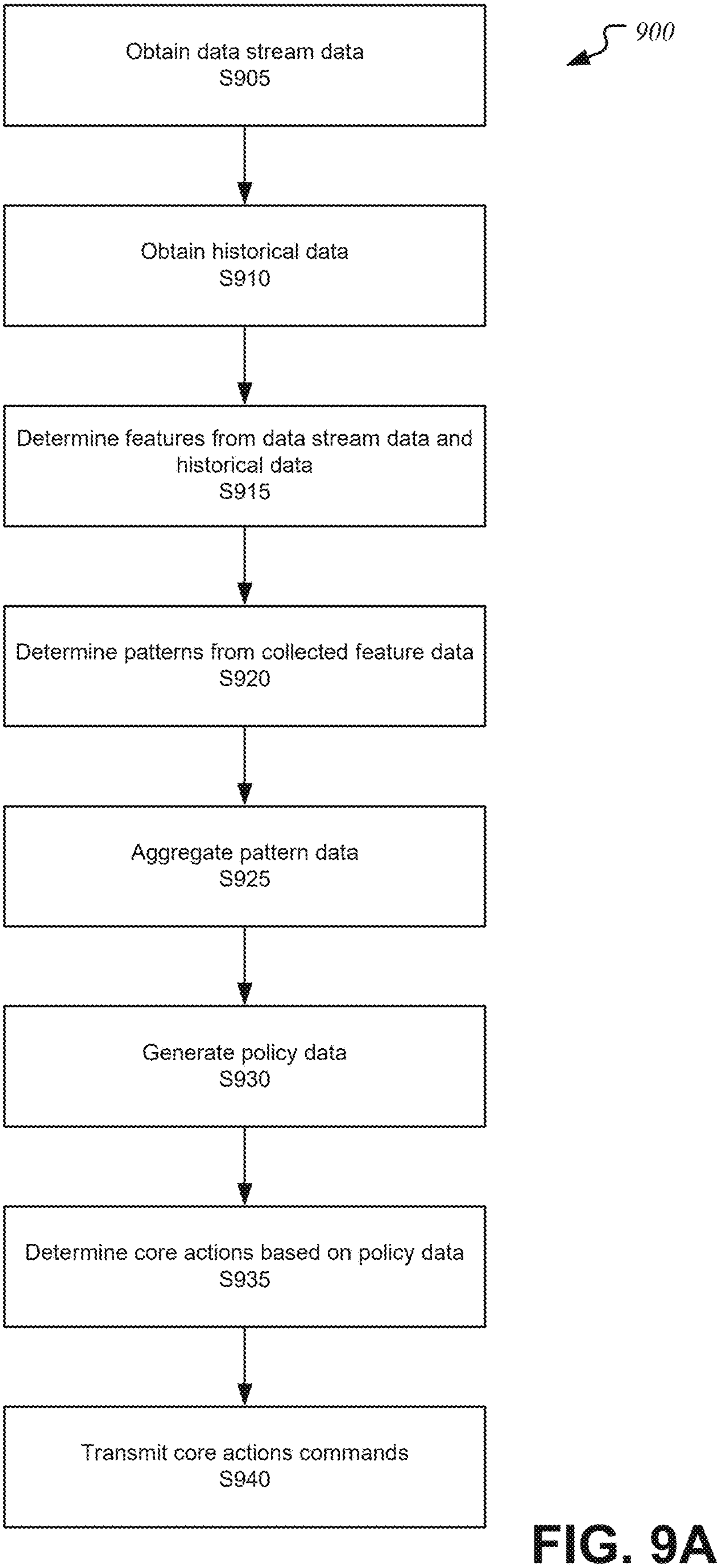
FIG. 9A is a flow chart for a method 900 of determining a management strategy and implementing core actions for a cooling system, according to an embodiment of the present disclosure.

To this end, FIG. 6 is a schematic for an AI-based control system 600 (herein also referred to as "the system 600") with a thermal storage tank 605 and AI-based control 610, according to an embodiment of the present disclosure. FIG. 9A is also discussed and referenced herein. To this end, FIG. 9A is a flow chart for a method 900 of determining a management strategy and implementing core actions for a cooling system, according to an embodiment of the present disclosure.

Briefly, with reference to FIG. 9A, the method 900 is described herein.

In an embodiment, step S905 is obtaining data stream data.

In an embodiment, step S910 is obtaining historical data.

In an embodiment, step S915 is determining features from the data stream data and the historical data.

In an embodiment, step S920 is determining patterns from collected feature data.

In an embodiment, step S925 is aggregating pattern data based on the determined patterns from the collected feature data.

In an embodiment, step S930 is generating policy data based on the aggregated pattern data.

In an embodiment, step S935 is determining core actions based on the generated policy data.

In an embodiment, step S940 is transmitting core action commands based on the determined core actions.

With reference to FIG. 6 and step S905 of FIG. 9A, in an embodiment, the AI-based control system 600 for district cooling operations can leverage data from various sources, such as data stream data 615 from an energy grid, weather stations, social networks, local sensors, and climate models, to continuously increase the efficiency of or optimize how chillers and storage tanks are used.

With reference to FIG. 6 and step S910 of FIG. 9A, in an embodiment, the AI-based control system 600 for district cooling operations can leverage data from various sources, such as historical data from the energy grid, weather stations, social networks, local sensors, and climate models, to further continuously increase efficiency of or optimize how the chillers and the storage tanks are used.

Upon receiving the data stream data 615, the AI-based control system 600 can synchronize the received data stream data 615. That is, the AI-based control system 600 can align the data stream data 615. Further, the AI-based control system 600 can perform anomaly management on the data stream data 615. That is, the AI-based control system 600 can impute missing data, exclude outliers in the data stream data 615, or flag data for future handling or processing. Further, the AI-based control system 600 can perform data harmonization on the data stream data 615. That is, the AI-based control system 600 can perform physical unit standardization of cooling units, storage units, etc., and align formatting of the data stream data 615.

Upon receiving the historical data, the AI-based control system 600 can generate a data buffer. That is, the AI-based control system 600 can make data available for generating a training dataset. The data stream data 615, the historical data, and the training data can be stored in a data lake.

Figure 7:
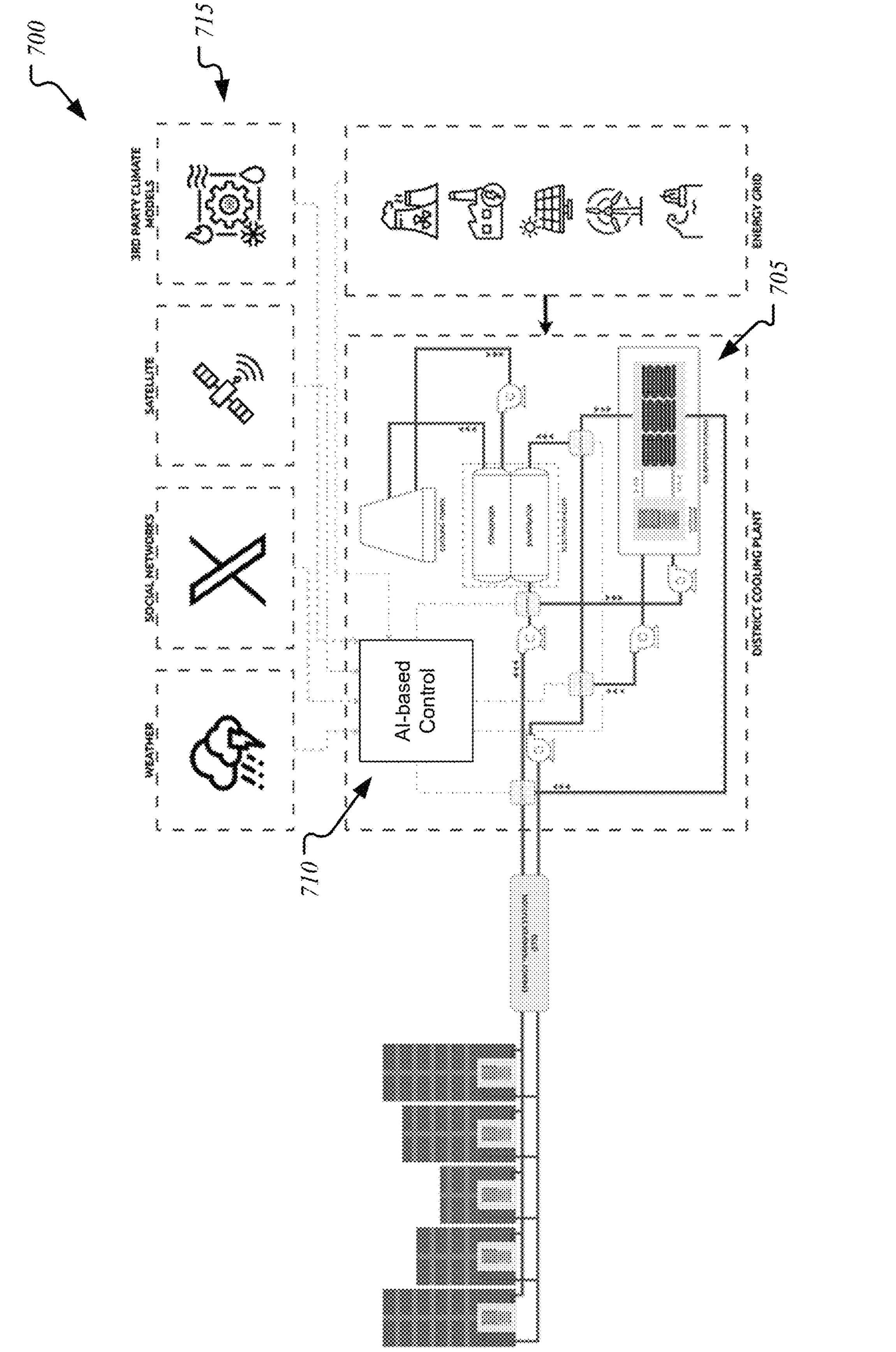
FIG. 7 illustrates an ice cooling district AI-based control, according to an embodiment of the present disclosure.

Briefly referring to FIG. 7, FIG. 7 is a schematic for an AI-based control system 700 (herein also referred to as "the system 700") with an ice-based battery storage 705 and AI-based control 710, according to an embodiment of the present disclosure. The AI-based control system 700 follows a similar method as the AI-based control system 600 but leverages the higher energy density of ice storage to further optimize or increase the efficiency between chiller operation and ice generation or melting. Since ice can store a larger amount of cooling energy per unit volume, the model can dynamically decide whether to freeze water during off-peak periods when electricity is cheaper or cleaner, and subsequently use the ice to handle heavy cooling loads during peak hours.

With reference to FIG. 7 and step S905 of FIG. 9A, in an embodiment, the AI-based control system 700 for district cooling operations can leverage data from various sources, such as data stream data 715 from an energy grid, weather stations, social networks, local sensors, and climate models, to continuously increase the efficiency of or optimize how chillers and storage tanks are used.

With reference to FIG. 7 and step S910 of FIG. 9A, in an embodiment, the AI-based control system 700 for district cooling operations can leverage data from various sources, such as historical data from the energy grid, weather stations, social networks, local sensors, and climate models, to further continuously increase the efficiency of or optimize how the chillers and the storage tanks are used.

Upon receiving the data stream data 715, the AI-based control system 700 can synchronize the received data stream data 715. That is, the AI-based control system 700 can align the data stream data 715. Further, the AI-based control system 700 can perform anomaly management on the data stream data 715. That is, the AI-based control system 700 can impute missing data, exclude outliers in the data stream data 715, or flag data for future handling or processing. Further, the AI-based control system 700 can perform data harmonization on the data stream data 715. That is, the AI-based control system 700 can perform physical unit standardization of cooling units, storage units, etc., and align formatting of the data stream data 715.

Upon receiving the historical data, the AI-based control system 700 can generate a data buffer. That is, the AI-based control system 700 can make data available for generating a training dataset. The data stream data 715, the historical data, and the training data can be stored in a data lake.

By employing pattern-based, multimodal models that fuse insights from the diverse data stream data 615, 715 and the historical data, the AI-based control system 600 and the AI-based control system 700 can dynamically adapt to changing conditions in real-time and balance multiple objectives, such as minimizing operational costs, reducing peak electricity demand, and maintaining indoor comfort.

A consensus mechanism among different predictive models enhances reliability, while fallback policies ensure stable performance when data is determined to be uncertain or when models disagree. The multi-objective, AI-driven method 900 offers far greater adaptability and responsiveness than rigid rule-based control. The method 900 guarantees a higher level of efficiency and optimization in resource allocation and cost-effectiveness.

In a system that utilizes a thermal storage tank, the AI-based control 610, 710 can continuously analyze real-time and forecasted data, such as electricity rates, ambient temperatures, and projected cooling loads, to determine the most efficient periods for charging and discharging the chilled water. By accounting for factors like overnight temperature drops and energy pricing, the method 900 can strategically use or activate the chillers when it is most cost-effective and ensure chilled water is stored for peak demand hours.

Across both storage methods, the AI-based control 610, 710 framework can integrate multiple data streams, apply consensus among predictive models, and swiftly enact fallback policies to maintain stability, leading to more reliable, cost-effective, and flexible district cooling operations than traditional rule-based strategies.

Figure 8:
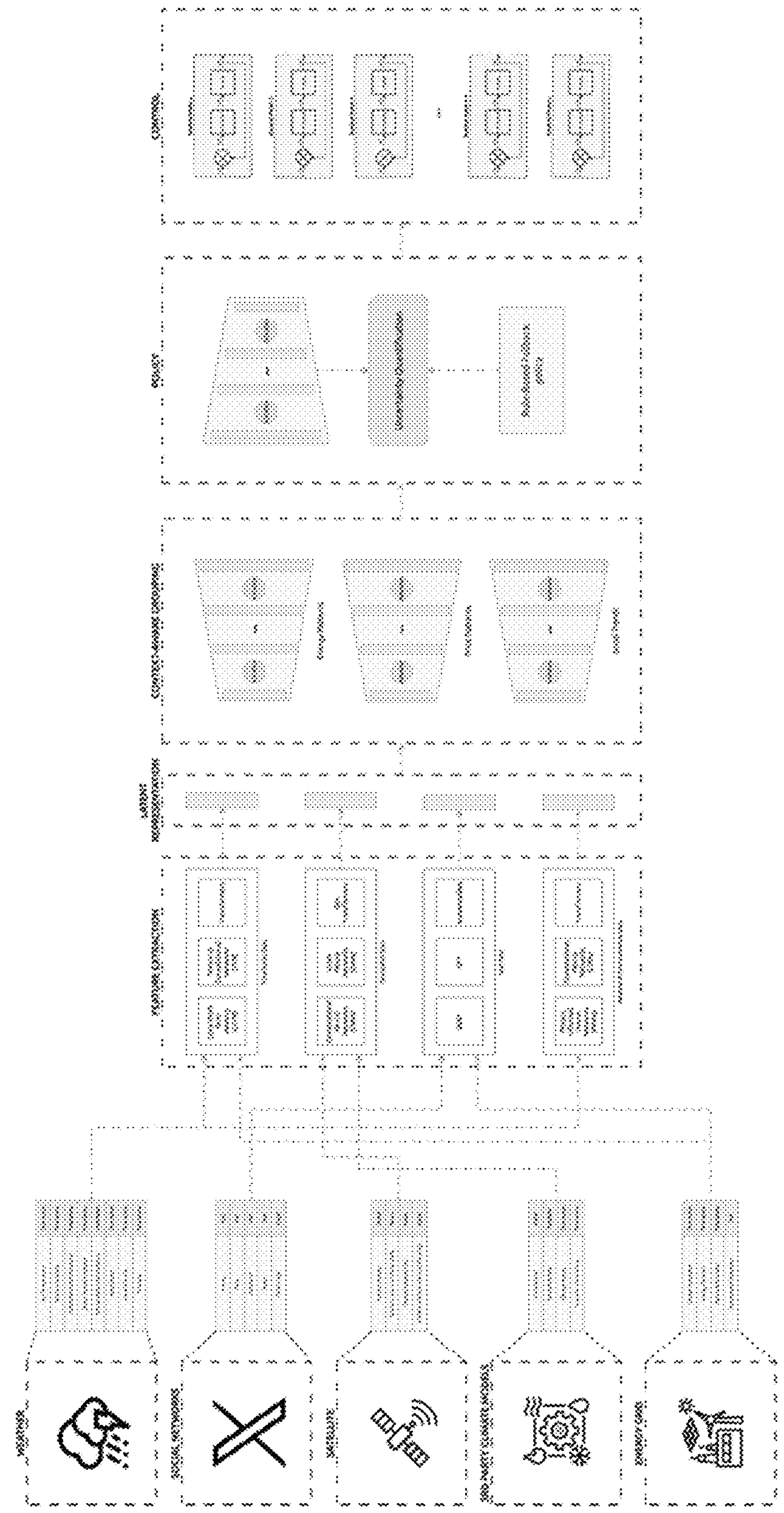
FIG. 8 illustrates an architecture of an AI-based controller, according to an embodiment of the present disclosure.

Thus, described herein is an architecture for the AI-based control 610, 710 with reference to FIG. 8 and FIG. 9A.

FIG. 8 is a schematic for an architecture of the AI-based control 610, 710, according to an embodiment of the present disclosure. In an embodiment, the architecture includes multimodal data gathering (steps S905 and S910), feature extraction (step S915), determining latent representations (or determining patterns from the collected feature data, step S920), context-aware grouping (or aggregating pattern data, step S925), generating policy data (step S930), and determining core actions based on policy data (step S935).

With regards to the steps S905 and S910 in the AI-driven method 900, the method 900 first involves collecting or obtaining data stream data 815 from a wide range of data sources, ensuring the system 700 (and/or the system 600) has a comprehensive view of both current and evolving conditions that might affect the district cooling network. In an embodiment, weather or environmental data, for example, can include time series measurements of air temperature, relative humidity, wind speed, wind direction, pressure, and solar irradiance parameters, e.g., global horizon irradiance (GHI), direct normal irradiance (DNI), and diffuse horizontal irradiance (DHI). By capturing these environmental variables, the AI-based control 610, 710 can anticipate changes in cooling demand driven by local climate factors.

Figure 9B:
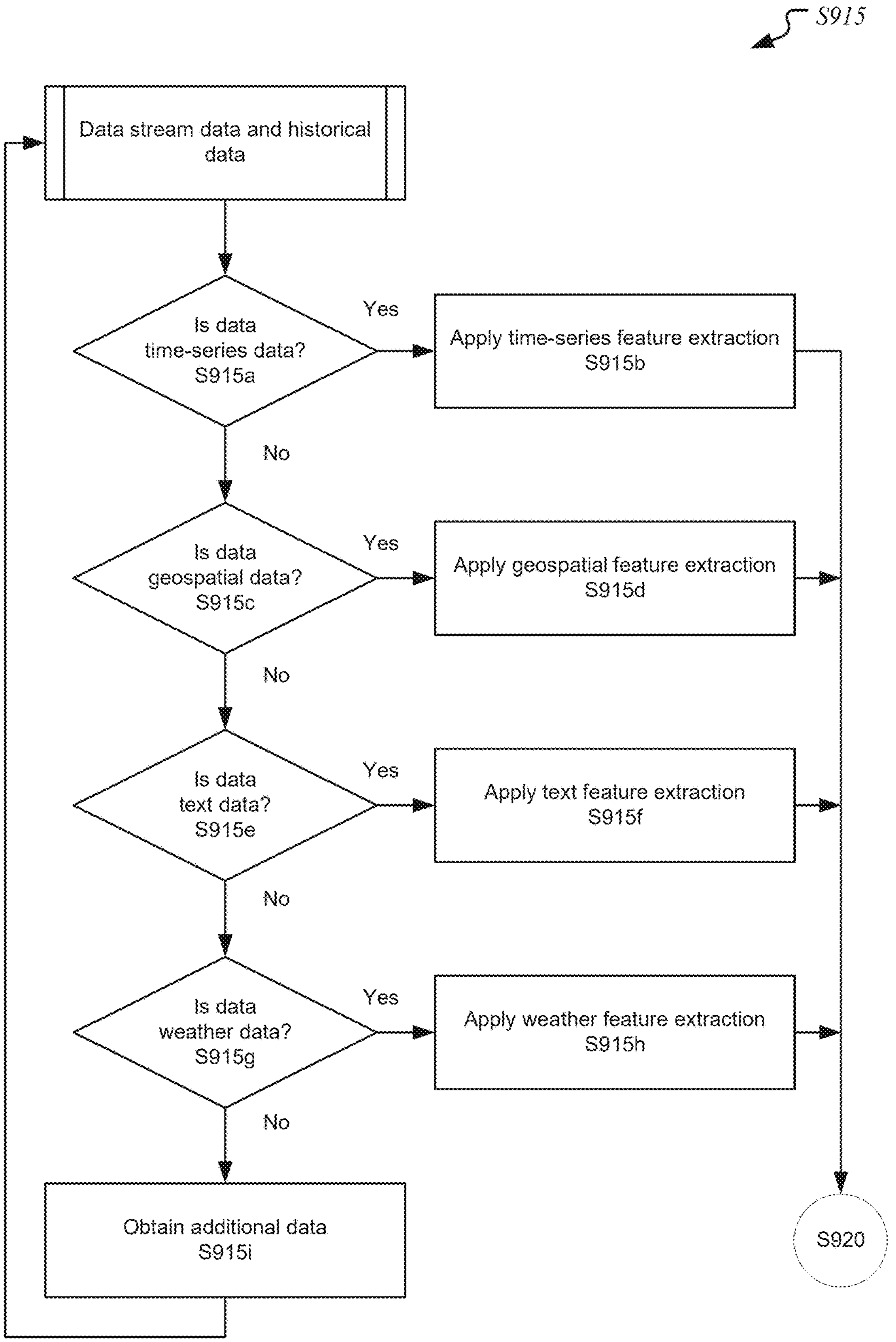
FIG. 9B is a flow chart for a sub-method describing step S915, according to an embodiment of the present disclosure.

With reference to FIG. 8 and FIG. 9B, the data stream data and historical data processing are described herein. FIG. 9B is described briefly.

FIG. 9B is a flow chart for a sub-method describing step S915, according to an embodiment of the present disclosure.

In an embodiment, step S915*a* is determining whether the data is time-series data.

In an embodiment, upon determining the data is time-series data, step S915*b* applying a time-series feature extraction to the time-series data.

In an embodiment, upon determining the data is not time-series data, step S915*c* is determining whether the data is geospatial data.

In an embodiment, upon determining the data is geospatial data, step S915*d* applying a geospatial feature extraction to the geospatial data.

In an embodiment, upon determining the data is not geospatial data, step S915*e* is determining whether the data is text data.

In an embodiment, upon determining the data is text data, step S915*f* applying a text feature extraction to the text data.

In an embodiment, upon determining the data is not text data, step S915*g* is determining whether the data is weather or environmental data.

In an embodiment, upon determining the data is weather or environmental data, step S915*h* applying a weather or environmental feature extraction to the weather or environmental data.

In an embodiment, upon determining the data is not weather or environmental data, step S915*i* is obtaining additional data stream and/or historical data.

In an embodiment, social networks represent another valuable data stream where relevant information can be extracted. Text-based inputs for the social network data stream data can include, for example, trends, posts, comments, and news articles. Graph-based inputs for the social network data stream data can include, for example, social graphs. The text, posts, and comments can be used to track trends, topics, or events that may influence user behavior. For example, sudden surges in building occupancy, public events, or general shifts in daily routines can be analyzed, modeled, and accounted for regarding energy use. Additionally, more structured social graph data can help reveal patterns of connectivity among different buildings, neighborhoods, or communities.

In an embodiment, satellite data provides a high-level, often large-scale, perspective of environmental conditions. Raster inputs of the satellite data can include optical imagery, synthetic aperture radar (SAR), thermal infrared (TIR), and light detection and ranging (LIDAR), which can each offer unique insights into surface temperatures, urban heat island effects, and land-use changes over time.

In an embodiment, climate models can supply longer-range, often ensemble-based forecasts and geo-referenced datasets that can project future climate scenarios and potential extreme weather events. The climate models can include gridded data (raster input), geospatial data (GeoJSON input), climate events (time-series input), and the ensemble forecasting (time-series input).

In an embodiment, energy grid data can include for example, energy generation, energy demand, and market and economic data as time-series inputs. The energy grid data can also include, for example, maintenance schedules as text inputs.

The combination of these diverse data sources creates a rich, multi-layered dataset. By integrating real-time measurements, social signals, and advanced climate modeling, the AI-based system 700 (and/or the system 600) is better equipped to make informed decisions about how best to manage and ensure maximum efficiency of the district cooling infrastructure.

Having gathered a diverse range of data in steps S905 and S910, from weather time series and satellite imagery to social network posts and climate model outputs, step S915 is to transform the data stream data 715 into meaningful features. The transformation is accomplished using deep learning models selected for target suitability to each data modality.

In an embodiment, with reference to step S915*b*, for time series data (e.g., temperature, pressure, and/or historical energy usage), models such as LSTMs (Long Short-Term Memory Networks), TCNs (Temporal Convolutional Networks), or Transformers capture temporal dependencies and trends advantageous for predicting future conditions. The purpose of the time-series feature extraction process is to convert historical and real-time data sequences (e.g., electricity prices, cooling demand, temperature logs) into features that capture trends, seasonality, and anomalies.

The time-series feature extraction process can include, for example, resampling and alignment to standardize timestamps so that all time-indexed datasets (e.g., 15-minute intervals, hourly intervals) are aligned.

The time-series feature extraction process can include, for example, rolling statistics determination to compute moving averages, standard deviations, and other rolling metrics (e.g., rolling min/max) to highlight short-term fluctuations.

The time-series feature extraction process can include, for example, seasonal decomposition to separate the daily/weekly/seasonal patterns from residual noise. This can be achieved using methods such as Seasonal-Trend decomposition using Loess (STL), which isolates trend, seasonal, and residual components.

The time-series feature extraction process can include, for example, lagged features generation to generate lag variables (e.g., cooling demand at t−1, t−2) to help predictive models capture autocorrelation.

The time-series feature extraction process can include, for example, window aggregations to, for a given look-back window, aggregate consumption or weather metrics (e.g., the sum of the last 4 hours of demand, an average of the previous 24 hours) to capture extended patterns.

The time-series feature extraction process can include, for example, anomaly markers determination to flag outliers or unusual spikes based on threshold detection or more advanced anomaly detection (like z-scores or Isolation Forest).

An output of the time-series feature extraction routine can be a structured vector of numeric features representing relevant temporal patterns (e.g., seasonal trends, recent spikes in demand).

In an embodiment, with reference to step S915*d*, for geospatial data, such as satellite imagery or vector-based spatial datasets, Convolutional Neural Networks (CNNs), Graph Neural Networks (GNNs), or Geo-Transformers can interpret patterns in images or node-link structures. The purpose of the geospatial feature extraction process is to leverage spatial data (e.g., satellite imagery, building footprints, land-use maps) to identify localized climate effects or usage patterns that might affect district cooling load.

The geospatial feature extraction process can include, for example, image preprocessing. For satellite or aerial imagery, transformations such as cropping to the region of interest, correcting for perspective, and normalizing pixel values are applied.

The geospatial feature extraction process can include, for example, convolutional feature encoding where CNNs or other computer vision pipelines are used to extract high-level features (e.g., surface temperature estimates, vegetation indices, and building density).

The geospatial feature extraction process can include, for example, GIS overlay building boundary shapes with known usage categories (residential, commercial, industrial) combined to produce localized usage density features.

The geospatial feature extraction process can include, for example, distance/proximity measurements to compute distances to relevant landmarks (power stations, water bodies) or city centers since distance can correlate with microclimate and grid constraints.

The geospatial feature extraction process can include, for example, urban heat island indicators determination. This can include deriving metrics such as NDVI (Normalized Difference Vegetation Index) or surface albedo to detect areas with higher cooling needs.

An output of the geospatial feature extraction routine can be spatially enriched vectors that capture local climate anomalies, land use, building density, and other location-based factors.

In an embodiment, with reference to step S915*f*, text-based information, such as social media posts to news articles, can be processed with Natural Language Processing (NLP) architectures like BERT, GPT, or Autoencoders, each capable of extracting context-rich representations from raw text. The purpose of the text feature extraction process is to analyze textual inputs from social media feeds, event calendars, local news, or occupant feedback. These text data can signal unusual occupancy, big events, or community behaviors affecting cooling demand.

The text feature extraction process can include, for example, text cleaning to remove irrelevant characters (HTML tags, punctuation), convert to lowercase, and optionally filter out stop words or irrelevant tokens.

The text feature extraction process can include, for example, a tokenization and embedding process to convert text into numeric form. Options include bag-of-words vectors, TF-IDF, or more advanced embeddings (e.g., BERT, GPT).

The text feature extraction process can include, for example, sentiment/topic detection to classify the general sentiment (positive/negative/neutral) or specific topics (e.g., "outdoor festival," "heat wave advisory") that might drive cooling usage.

The text feature extraction process can include, for example, event frequency and intensity determination to flag a mention frequency of certain keywords (e.g., "concert," "sports event"), especially when large crowds or extended operating hours are expected.

The text feature extraction process can include, for example, relevance filtering to automatically discard or downweight text entries unrelated to local energy usage (e.g., trending hashtags with no local or weather context).

An output of the text feature extraction process can be numerical or categorical vectors summarizing how local discussions/events can influence demand (e.g., a "likely high occupancy" flag).

In an embodiment, with reference to step S915*h*, weather-based information, such as sensor data, can be processed with Physics Informed Neural Networks (PINNs), CNNs, and transformers. The purpose of the weather feature extraction process is to convert raw weather data (temperature, humidity, wind speed, solar irradiance, etc.) into concise features that precisely capture how environmental conditions drive cooling needs.

The weather feature extraction process can include, for example, raw data normalization to standardize units (e.g., ° C. vs. ° F., relative vs. absolute humidity) and handle missing entries via interpolation or smoothing.

The weather feature extraction process can include, for example, derived weather indices to determine heat index, dew point, or other comfort metrics (e.g., Wet-Bulb Globe Temperature) that are often more predictive of cooling demand than temperature alone.

The weather feature extraction process can include, for example, cumulative/peak determinations to capture daily or hourly temperature or solar irradiance peaks to reflect extreme conditions.

The weather feature extraction process can include, for example, seasonal indicators determination to add features indicating the time of year (summer vs. winter) or major local climate patterns (monsoon season, dust storm likelihood).

The weather feature extraction process can include, for example, comparing forecast versus observed weather data to track the accuracy of prior weather forecasts to calibrate future predictions and assign confidence levels.

An output of the weather feature extraction process can be, at relevant intervals, a numeric set of weather-related features (e.g., temperature, humidity, wind speed, heat index, solar irradiance).

A format of the outputs from steps 915*b*, 915*d*, 915*f*, and 915*h* can be latent (vector) representations, which can be used as inputs for the context-aware grouping (described below).

Notably, a major advantage of the feature extraction stage is flexibility. Since every district cooling setup can vary in data availability, scale, or domain-specific constraints, the models can be treated as interchangeable modules rather than fixed components. For instance, a system with abundant high-resolution satellite data can rely heavily on or apply more weights to CNNs for image analysis, while another environment lacking satellite coverage can rely more on time series forecasts and text-based social media insights. This modular design ensures that the AI pipeline can be easily adapted to different operational contexts, accommodating everything from minor upgrades in sensor technology to major shifts in data sources or business requirements. By deploying the most appropriate models for the data at hand, the system not only isolates key signals and reduces noise but also remains adaptable in the face of evolving real-world conditions.

After each data modality has been processed by an appropriate deep-learning model, the system translates the resulting high-dimensional features into the more compact latent representations in step S920 to eventually determine data patterns.

Figure 9C:
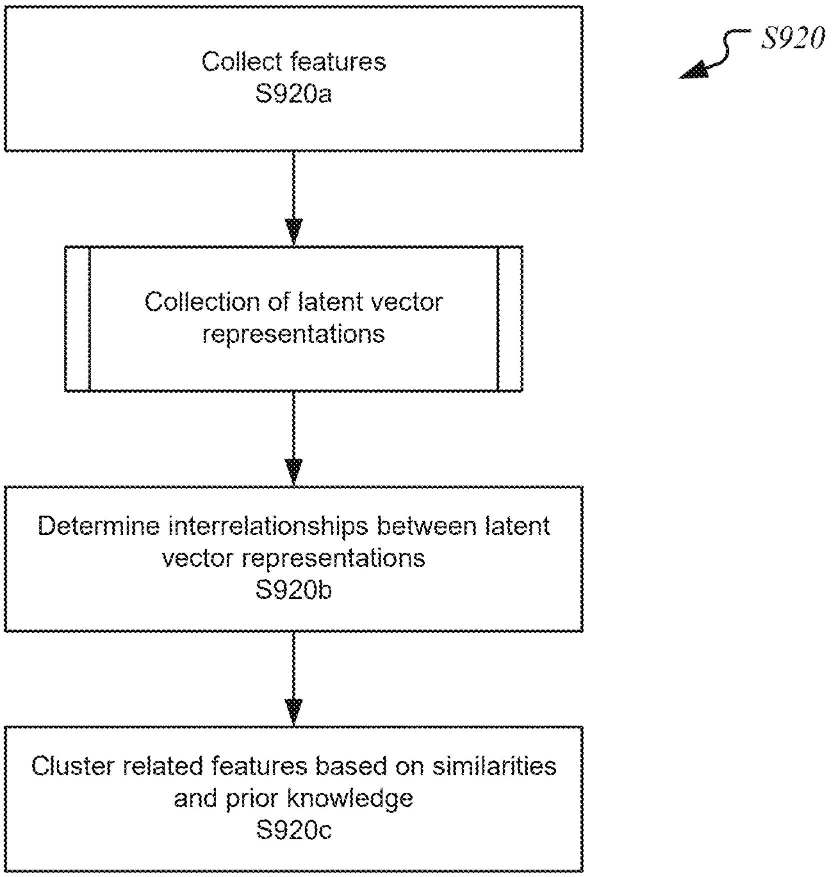
FIG. 9C is a flow chart for a sub-method describing step S920, according to an embodiment of the present disclosure.

To this end, FIG. 9C is a flow chart for a sub-method describing step S920, according to an embodiment of the present disclosure.

In an embodiment, step S920*a* is collecting or aggregating the features to generate a collection or a set of latent vector representations.

In an embodiment, step S920*b* is consolidation by determining interrelationships using correlation or mutual information analysis.

In an embodiment, step S920*c* is domain-guided grouping by clustering or aggregating related features based on prior knowledge and the determined interrelationships describing similarities between the latent vector representations.

In an embodiment, step S920*d* is generating the pattern data, which can include energy patterns, economic patterns, and social patterns.

The pattern determination process typically involves projecting feature vectors from each modality (time series, geospatial data, text, or weather) into a lower-dimensional space that preserves essential information while shedding extraneous or redundant details. By doing so, the system mitigates the challenges of dimensionality, which can be an issue particularly pronounced in multimodal datasets. The pattern determination can make the data easier to handle, compare, and combine when various data types are involved.

The latent representations serve as a unifying framework for downstream operations. Rather than grappling with raw sensor readings, text embeddings, and complex geospatial features in all their original forms, the AI-based control 610, 710 can work with a set of streamlined, context-rich vectors. This step can generate an efficient, scalable architecture: not only does the process reduce computational overhead, but it also supports a more robust fusion of insights from multiple sources. Whether an LSTM, CNN, or NLP model is feeding into the method 900, the latent representation layer ensures that subsequent modules deal with coherent, standardized inputs, thereby simplifying the design of the entire decision-making pipeline.

Once the data stream data 815 and the historical data have been distilled into compact latent representations, the latent vector representations are passed to a context-aware aggregation or grouping process. The grouping process, typically implemented as a small yet deep neural network, is responsible for organizing the latent features into logical clusters or categories relevant to district cooling operations. For example, certain features might relate to energy usage patterns, while others capture price fluctuations, and still others highlight social or environmental trends. By grouping together vectors that share contextual similarities, the system forms higher-level abstractions that reflect the key drivers of cooling demand, operational costs, or user behavior.

In an embodiment, the energy pattern data can focus on predicting energy supply, demand, and associated greenhouse gas (GHG) emissions. The energy pattern data can include, for example, generated forecasts describing how much renewable (solar, wind) or conventional (fossil, nuclear) energy is expected to be available over the next hours/days. The energy pattern data can include, for example, demand profiles describing short-term projections for a district's cooling load, factoring in time of day, weather conditions, and occupant behavior. The energy pattern data can include, for example, emission signals describing real-time and forecasted grid carbon intensity, indicating whether the generation is primarily fossil-based or cleaner. The energy pattern data can allow the system 600, 700 to schedule "cooling production" at times when GHG emissions are lower (e.g., high solar availability or less fossil fuel usage) and to avoid high-emission peak hours. The energy pattern data can ensure that chiller and ice battery operations align with the lowest carbon and the most cost-efficient windows.

In an embodiment, the economic pattern data can focus on forecasting price signals, operational costs, and overall financial impact. The economic pattern data can include, for example, electricity price forecasts describing upcoming variations in electricity tariffs, including peak/off-peak times or dynamic pricing linked to grid conditions. The economic pattern data can include, for example, cost-benefit analyses with estimations of chiller operation costs, ice battery charging/discharging costs, and potential penalties (e.g., ramp-up charges for chillers). The economic pattern data can include, for example, budget constraints and revenue opportunities describing how the cooling facility might earn incentives for reducing peak load or shifting consumption to off-peak periods.

In an embodiment, the social pattern data can focus on capturing occupancy behavior, local events, and other human factors that drive cooling demand. The social pattern data can include, for example, event forecasts describing large gatherings, holidays, or even short-term surges in occupancy at certain sites (e.g., an outdoor festival announced on social media). The social pattern data can include, for example, sentiment and behavior analysis gauging mood or general sentiment from social media discussions, which can hint at changes in occupant comfort needs or special requests (e.g., an "extreme heat wave" trending locally). The social pattern data can include, for example, determined usage patterns describing distinctions between residential vs. commercial schedules (e.g., office hours vs. nighttime usage in residential complexes). The social pattern data can prevent the system 600, 700 from underestimating or overestimating demand. If a major event is announced for tomorrow evening, the AI-based control 610, 710 can preemptively adapt the chiller/ice battery schedule. The social pattern data can enhance occupant comfort by aligning energy usage with actual social/behavioral patterns and demand rather than purely historical averages.

This grouping mechanism allows the AI pipeline to dynamically adapt its understanding of how different factors interrelate. An abrupt change in weather patterns or a sudden spike in social media discussions about a local event can shift certain features into new groups, flagging them for closer attention. Meanwhile, features that remain stable or follow predictable cycles might remain in their existing group. This targeted form of "intelligent segmentation" enhances interpretability and ensures that subsequent decision-making components, such as the policy network, can draw on aggregated insights tailored to each functional domain—be it energy, pricing, or social patterns.

Building on the context-aware groupings produced in the previous stage, the policy determination process (step S930) is responsible for converting these aggregated insights into actionable control signals for the district cooling infrastructure. At the heart of this module is a Multi-Layer Perceptron (MLP) that ingests the grouped features, such as energy, pricing, and social trends, and determines and outputs setpoints for elements like chiller operation, storage tank charging and discharging, and pump speeds for increased efficiency. Since the system 600, 700 can be tasked with balancing a variety of objectives (cost optimization, reliability, occupant comfort, and emissions reduction), the MLP considers multiple performance metrics when determining policies and recommendations. This approach provides a flexible framework that can be adapted to different priorities, whether that includes placing a premium on cost savings or minimizing environmental impact.

Notably, the policy determination process incorporates an uncertainty quantification process to ensure safe and stable operation. By gauging the confidence of its predictions, using techniques such as Bayesian methods, Monte Carlo dropout, or ensemble modeling, the system 600, 700 can detect scenarios in which data is insufficient or inconsistent or when the AI-based control 610, 710's projections are highly uncertain.

In an embodiment, the uncertainty quantification process can include receiving forecasts and confidence levels, where predicted demands, energy pricing, emissions data, and social signals from the forecasting step are obtained, with each accompanied by a confidence measure (e.g., probability distributions, standard deviations). The uncertainty quantification process can include assessing overall risk by calculating an "uncertainty score" by combining each forecast's variance. For example, if occupant surge forecasts vary widely, occupant load risk is high. For example, if electricity prices or GHG emissions are unpredictable, the cost/carbon risk is high. For example, this risk score becomes a key factor in deciding how aggressively or conservatively to schedule cooling resources. The uncertainty quantification process can include flagging potential instabilities, wherein if the model detects abnormally high uncertainty for critical variables (e.g., demand could swing by ±50%), the uncertainty quantification process raises a caution flag, prompting the system to explore fallback or more conservative approaches. An output of the uncertainty quantification process can be a refined operating context including an uncertainty index or set of flags indicating whether the system can proceed with advanced emission minimization or should be more cautious.

In an embodiment, a process to compare real-time data versus pattern-based forecasts can include gathering live measurement data, such as collecting current occupant counts, real-time electricity prices, and chiller performance data. The process to compare real-time data versus pattern-based forecasts can include deviation analysis, which can compare real-time observations against pattern-based forecasts from the last update, and if certain deviations exceed thresholds (e.g., actual occupant load is significantly above predicted), the system 600, 700 updates the current risk or uncertainty estimates. The process of comparing real-time data versus pattern-based forecasts can include potential reforecast or adjustments forecasting, which can invoke quick forecasting or partial recalibration to ensure decisions remain aligned with the real situation.

In these cases, the AI-based control 610, 710 seamlessly switches to a fallback rule-based policy or control (RBC), providing a safety net that prevents operational anomalies. This dual-level strategy ensures that, in most cases, the system 600, 700 benefits from sophisticated AI-driven efficiency increases, but in moments of uncertainty, can rely on established operational rules to maintain stability and continuity.

In an embodiment, a process to generate proposed setpoints can include gathering inputs, such as forecast (now refined by any new real-time data), constraints (ice battery capacity, chiller ramp rates), objectives (minimize GHG emissions, minimize costs, maintain occupant comfort, etc.), and current uncertainty score. The process to generate proposed setpoints can include generating setpoint candidates using an optimization model (e.g., an operations research solver, a reinforcement learning policy, or a hybrid approach). The system 600, 700 can generate proposed setpoints such as chiller load (e.g., 70% vs. 90% capacity) or ice battery charging/discharging schedule (e.g., charge overnight at 1 AM or wait until 3 AM). Further, each candidate setpoint plan can have an expected outcome (cost savings, GHG reduction, occupant comfort level). The process to generate proposed setpoints can include risk-aware ranking where the proposed setpoints are based on a combined metric, such as weighted cost+GHG+occupant comfort+risk penalty if uncertainty is high. Then, the top candidate(s) for the proposed setpoint are considered for implementation. Thus, an output of the process to generate proposed setpoints can include a proposed plan or set of control signals (an "optimal" or "high efficiency" schedule) that is subject to final checks, including reverting to the RBC.

To this end, in an embodiment, a process to switch to the RBC can include checking an uncertainty threshold, where when the system 600, 700's overall risk or uncertainty score exceeds a predetermined or set threshold (e.g., extremely volatile occupant demand, unpredictable energy prices), the candidate proposed setpoints are marked as high risk. The process to switch to the RBC can include triggering the rule-based backup, where the system 600, 700 reverts to a predetermined or pre-established strategy or process. The predetermined strategy can include, for example, running the chiller at a safe but non-objective-minimizing schedule or charging battery storage (thermal tank or ice-based) on a fixed off-peak timetable. The fallback can ensure occupant comfort and basic cost control even during less optimal time frames during normal conditions. The process to switch to the RBC can include blending or overriding, where the system 600, 700 partially adopts the candidate proposed setpoints but overrides any steps or setpoints that are determined to be overly aggressive in order to ensure safe operation. Thus, an output of the process to switch to the RBC can include a proven or stress-tested rule-based strategy or process when the candidate-proposed setpoints are determined to exceed an uncertain or risk threshold or a hybrid strategy or process that blends the candidate-proposed setpoints and the RBC strategy having safe heuristics.

The next stage (step S935) translates the policy determination process output into concrete actions for the physical components of the system 600, 700 and auxiliary district cooling infrastructure. This is achieved by feeding the recommended or proposed setpoints, such as chiller load levels, battery storage charge/discharge times, valve positions, pump speeds, and tank charging schedules, into existing PID controllers and other control systems included in the system 600, 700 and the district cooling infrastructure. In practice, this means that the high-level decisions made by the AI-based control 610, 710 are continually fine-tuned at the hardware level to maintain system 600, 700 stability and respond to real-world dynamics, such as fluctuations in flow rates or unexpected operational constraints.

In an embodiment, a process to determine transmitted or final setpoints includes generating a combined or consolidated policy. The policy compares the top candidate setpoint plan and the RBC, then determines a policy that most effectively meets occupant comfort, cost, GHG, and risk requirements. The process to determine transmitted or final setpoints includes publishing or transmitting commands or actions to physical equipment. Once finalized, the setpoints are transmitted (step S940) to the district cooling network controllers, such as chiller setpoints, ice battery schedules, pump speeds, valve positions, etc. The process to determine transmitted or final setpoints includes continuous monitoring and feedback. As execution proceeds, the system 600, 700 monitors performance and occupant comfort, feeding that data back into the model to detect any emerging deviations or new sources of uncertainty.

By bridging the gap between AI-driven strategic planning and low-level mechanical control, the system 600, 700 ensures that insights gleaned from multimodal data streams lead to tangible improvements in efficiency, cost-effectiveness, and resilience. Rapid feedback loops allow the PID controllers to adjust cooling distribution in real time, preventing issues like overcooling or sudden pressure drops. In essence, the step S935 transforms the intelligence from the earlier stages spanning data gathering, feature extraction, policy generation, and uncertainty management into seamless and adaptive plant operation.

The method 900 offers a range of benefits and advantages, including:

1. Improved Energy Efficiency: The system shifts cooling production to off-peak hours, significantly reducing energy consumption and cost.
2. Adaptive Demand Control: It diminishes energy wastage by predicting future demand, thus operating with foresight.
3. Cost Savings: By efficiently utilizing energy and responding to real-time energy prices, our system offers economic benefits for providers and users.

Examples

The developed simulation model demonstrates the potential of demand-side cooling control and optimized generation strategies to address the UAE's emissions challenges. It incorporates realistic cooling, base load profiles, and storage solutions like ice and electrical batteries.

Scenario 1: No Storage (Baseline)—System depends entirely on power plants, leading to high fossil reliance.

Scenario 2: Ice Storage (Not Optimized)—Ice storage is used without optimization, focusing on offsetting cooling loads.

Scenario 3: Ice Storage Basic Optimization—Incorporates ice storage with fossil plant costs modeled as a linear function.

Scenario 4: Ice Storage Advanced Optimization—Extends the linear model by considering quadratic fossil cost penalties.

The simulation models a hybrid power system, including:

Nuclear Plant: Constant generation, providing a stable energy base.

Solar Plant: Energy generated based on a normalized irradiance profile.

Fossil Plant: Flexible output constrained by ramp rates and capacity, with costs increasing quadratically.

Ice Storage: Designed to offset cooling loads with constraints on charge/discharge rates and round-trip efficiency.

Figure 10:
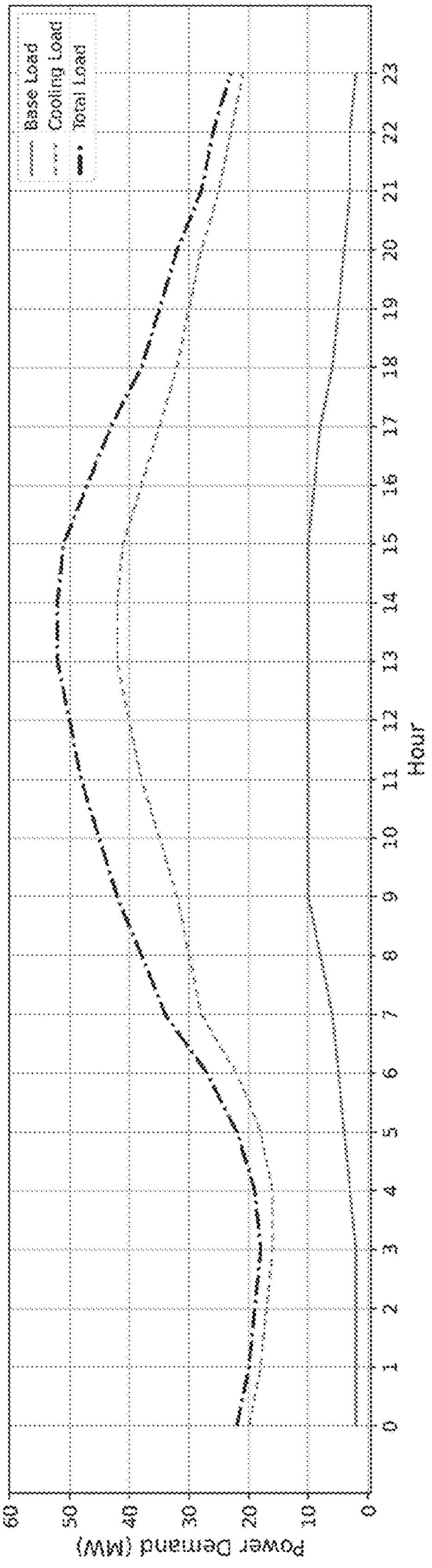
FIG. 10 is a graph illustrating load profiles for a Base Load, Cooling Load, and Total Load, according to an embodiment of the present disclosure.

Load profiles for a single day are shown in FIG. 10, with separate cooling and base loads contributing to the total demand.

Scenario Results

Scenario 1: No Storage

Figure 11:
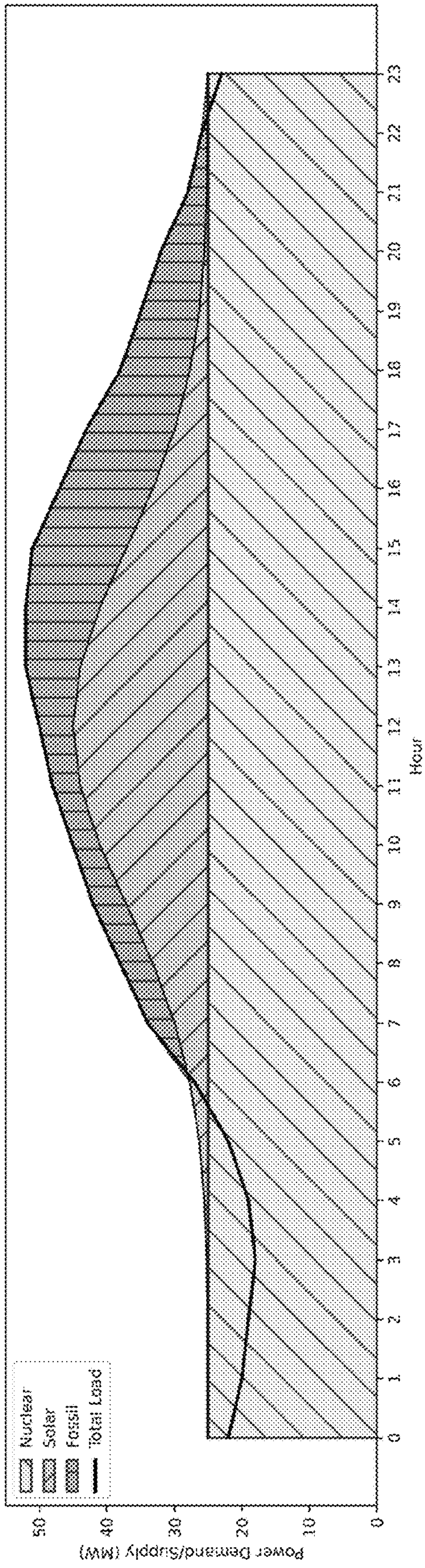
FIG. 11 is a graph illustrating a power demand/supply without storage, according to an embodiment of the present disclosure.

In the baseline scenario (FIG. 11), fossil plants ramp up during peak cooling demand, resulting in significant emissions and inefficiencies. Without storage, surplus energy from nuclear and solar sources is wasted, and deficits are met by ramping up the fossil plant's output. This increases reliance on fossil fuels during peak hours, resulting in inefficiencies and increased emissions.

Scenario 2: Ice Storage (Not Optimized)

Figure 12:
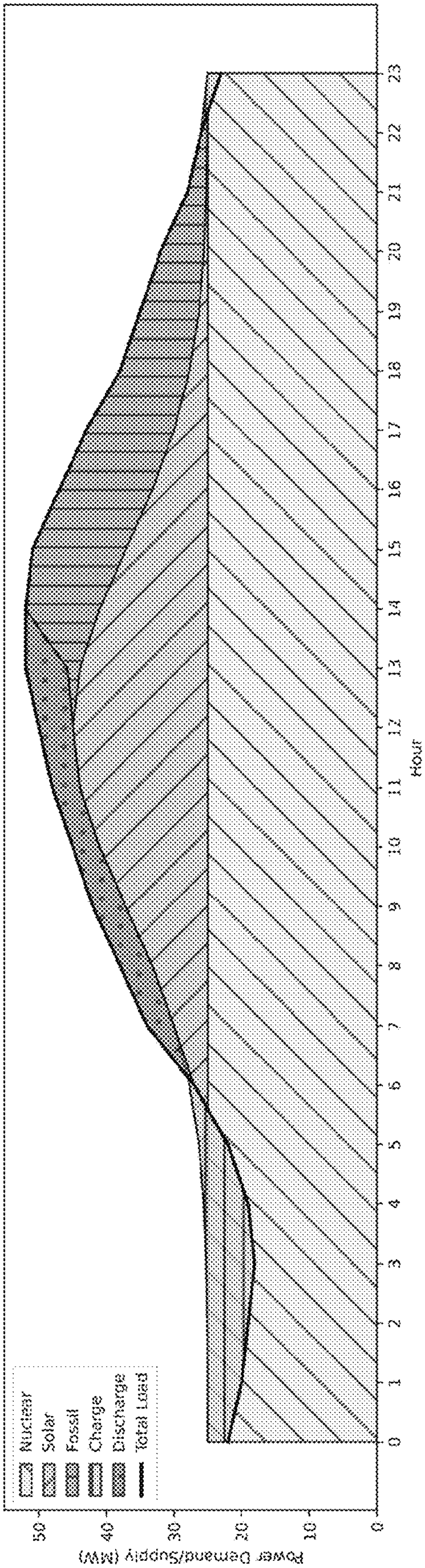
FIG. 12 is a graph illustrating a power demand/supply with a basic ice storage strategy, according to an embodiment of the present disclosure.

As shown in FIG. 12, ice storage partially offsets cooling loads. However, without optimization, fossil plants are still over-utilized during peak hours, and ramping constraints are not fully addressed.

Scenario 3: Ice Storage (Basic Optimization)

Figure 13:
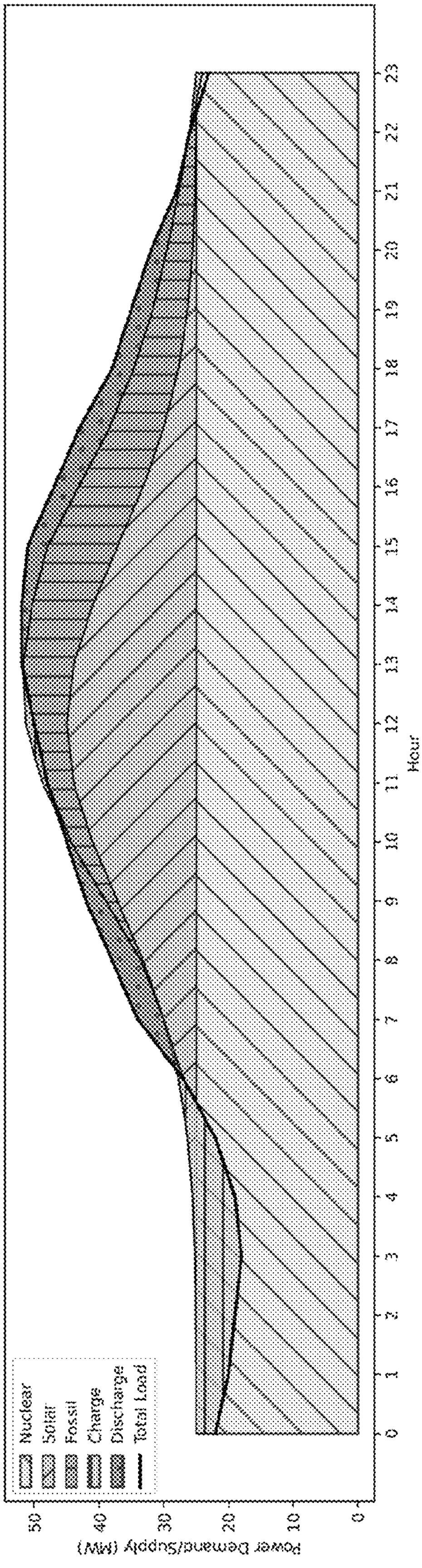
FIG. 13 is a graph illustrating a power demand/supply with an assumed linear cost with maximized efficiency, according to an embodiment of the present disclosure.

Optimizing fossil fuel usage under a linear cost model reduces reliance on fossil plants during peak hours (FIG. 13). The linear cost model for fossil plants is given by:

$$\text{Cost }(P)=a+b\cdot P$$

where:

a: represents the fixed overhead cost incurred regardless of how much power the fossil plant generates. This includes expenses such as maintenance, staffing, and operational readiness.

b: the linear cost per megawatt-hour (MWh) generated accounts for the fuel consumed and other variable costs that scale with power output.

In this scenario, ice storage charges during periods of solar surpluses, typically during midday hours, and discharges during peak cooling demand in the evening. This strategy offsets the need for fossil generation to ramp up during high-demand periods, smoothing fossil fuel usage throughout the day. The absence of penalties for ramping ensures the system focuses purely on minimizing total fossil fuel consumption, leveraging clean energy sources and ice storage to achieve this goal.

From a realistic perspective, the linear cost model is suitable for approximating the operational dynamics of many fossil plants, where fuel consumption and associated costs scale directly with power output. However, it does not account for the added inefficiencies and wear-and-tear associated with frequent ramping, which becomes evident in more advanced cost models.

Linear cost optimization considers fixed overhead costs (constant a) and incremental costs per unit of fossil generation (constant b). Quadratic cost optimization adds a penalty for high fossil outputs (constant c), discouraging excessive ramping and incentivizing smoother load balancing through ice storage usage.

Scenario 4: Ice Storage (Advanced Optimization)

Figure 14:
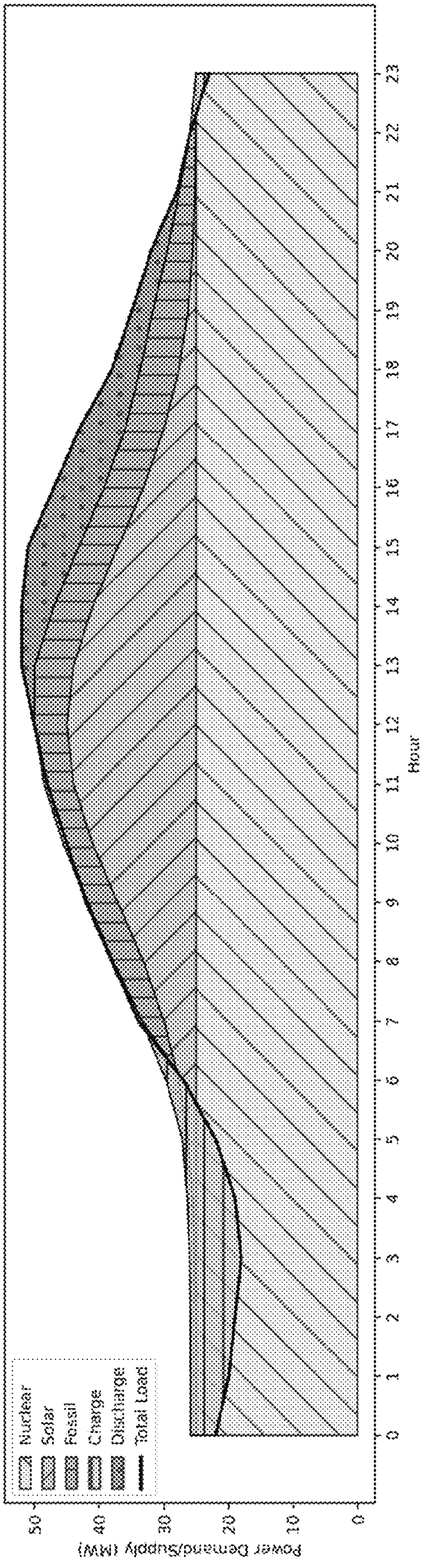
FIG. 14 is a graph illustrating a power demand/supply with a quadratic penalty that reduces reliance on fossil fuels during peak hours by encouraging more effective ice storage and solar energy use, resulting in smoother fossil fuel usage and enhanced system efficiency, according to an embodiment of the present disclosure.

Introducing a quadratic cost term for fossil generation further enhances the system's efficiency by penalizing high fossil outputs (FIG. 14). The cost model in this scenario is:

$$\text{Cost }(P)=a+b\cdot P+c\cdot P^2$$

where:

c: the quadratic term penalizes disproportionately high-power outputs, reflecting increased wear-and-tear, emissions, and inefficiencies when fossil plants operate near their capacity.

By penalizing high fossil outputs, this cost model incentivizes greater reliance on ice storage and solar integration to meet demand. Ice storage charges during periods of surplus solar generation and discharges during cooling peaks, reducing the need for fossil plants to ramp up sharply. This reduces operational costs and aligns with sustainability goals by minimizing emissions.

From a practical perspective, the quadratic cost model reflects real-world inefficiencies in fossil plant operations, where excessive ramping and high outputs lead to increased fuel consumption and maintenance costs. The integration of quadratic costs ensures a more balanced and sustainable energy mix, promoting the use of clean energy and storage technologies.

Figure 15:
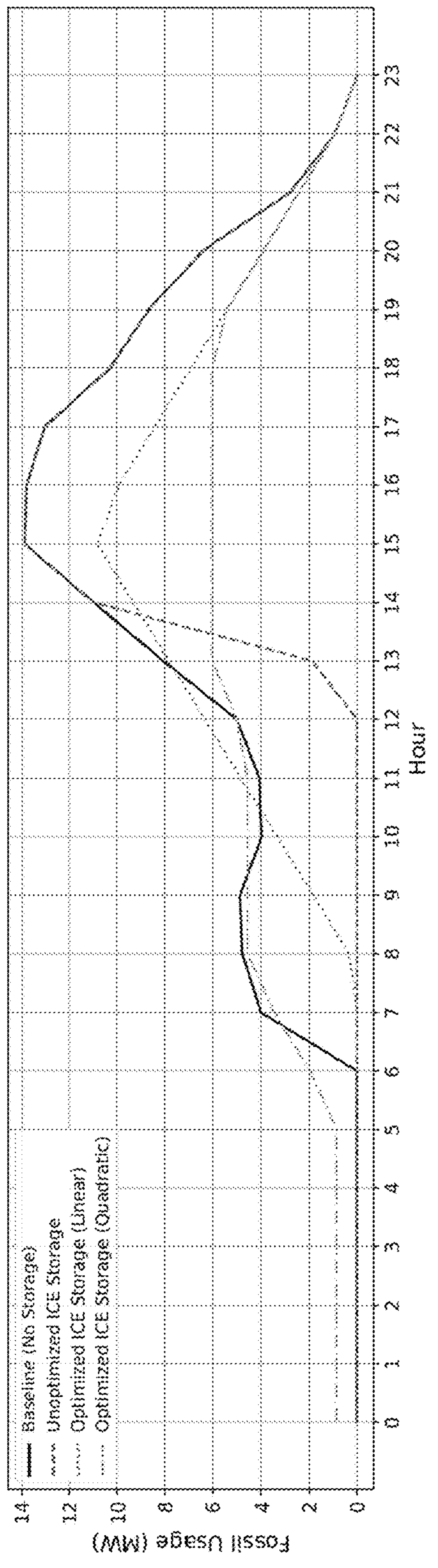
FIG. 15 is a graph illustrating a fossil usage comparison across scenarios, according to an embodiment of the present disclosure.

The total fossil fuel usage and its peak demand across scenarios are summarized in FIG. 15. The absence of storage leads to an over-reliance on fossil fuel plants, especially during peak cooling hours. This scenario results in higher emissions and a less balanced grid as fossil generation ramps up to meet shortfalls in clean energy supply (nuclear and solar). Scenarios 3 and 4 demonstrate the benefits of optimization in reducing emissions and achieving sustainability goals.

The integration of ice storage significantly reduces the total fossil fuel usage and peak fossil plant output. Without ice storage, the total fossil usage over the day is 115.6 MWh. Even in a not-optimized scenario, ice storage reduces this usage to 82.6 MWh, representing a 28.5%

Key Insights:

Peak Shaving: Ice storage reduces fossil plant peaks by offsetting cooling loads, improving grid stability.

TABLE 1

Comparison of Fossil Usage Across Scenarios

| Scenario | Total Fossil Usage (MWh) | Peak Fossil Usage (MW) | Reduction in Peak Usage (%) |
|---|---|---|---|
| Baseline (No Storage) | 115.6 | 13.9 | 0.0 |
| Unoptimized Ice Storage | 82.6 | 13.9 | 0.0 |
| Optimized Ice Storage (Linear) | 82.6 | 10.8 | 21.9 |
| Optimized Ice Storage (Quadratic) | 82.6 | 6.0 | 56.6 |

Sustainability: Optimized scenarios utilize more solar and nuclear energy, reducing emissions.

Cost Efficiency: The ability of ice storage to smooth out demand peaks significantly, as in Scenario 4, reduces the ramping requirements for fossil plants, thereby improving operational efficiency and lowering emissions. This results in a more balanced grid, as the clean energy sources contribute more effectively.

While electrical batteries can offset any load, ice storage is tailored for cooling loads, making it a cost-effective solution for addressing specific energy demands. Ice storage can still be integrated with electrical batteries to offer a more comprehensive solution by addressing both cooling and general electrical demands.

These insights are particularly relevant for the UAE, where peak cooling loads coincide with high solar generation potential during daytime hours. This highlights the value of integrating ice storage and advanced fossil fuel cost modeling into power systems. Such strategies can address the UAE's energy challenges, providing scalable sustainability and operational efficiency solutions.

Implementing the method 900 via the system 600, 700 will involve a seamless integration process into the existing cooling infrastructure. This ensures that the system is tailored to suit the specific requirements of the district cooling facility. Compatibility considerations are considered to ensure a smooth integration process with existing systems.

The method 900 and the system 600, 700 offers significant environmental benefits, contributing to a greener and more sustainable future. This section highlights the positive impact on the environment:

The system reduces carbon emissions and lowers overall energy consumption by shifting cooling production to off-peak hours and optimizing energy usage. This decreases the facility's carbon footprint and aligns with global efforts to combat climate change.

Adherence to regulatory and industry standards is paramount for the system's reliability and credibility. The method 900 and the system 600, 700 will ensure system compliance and alignment with regulatory guidelines, ensuring it operates safely and efficiently within the defined legal and environmental frameworks.

Figure 16:
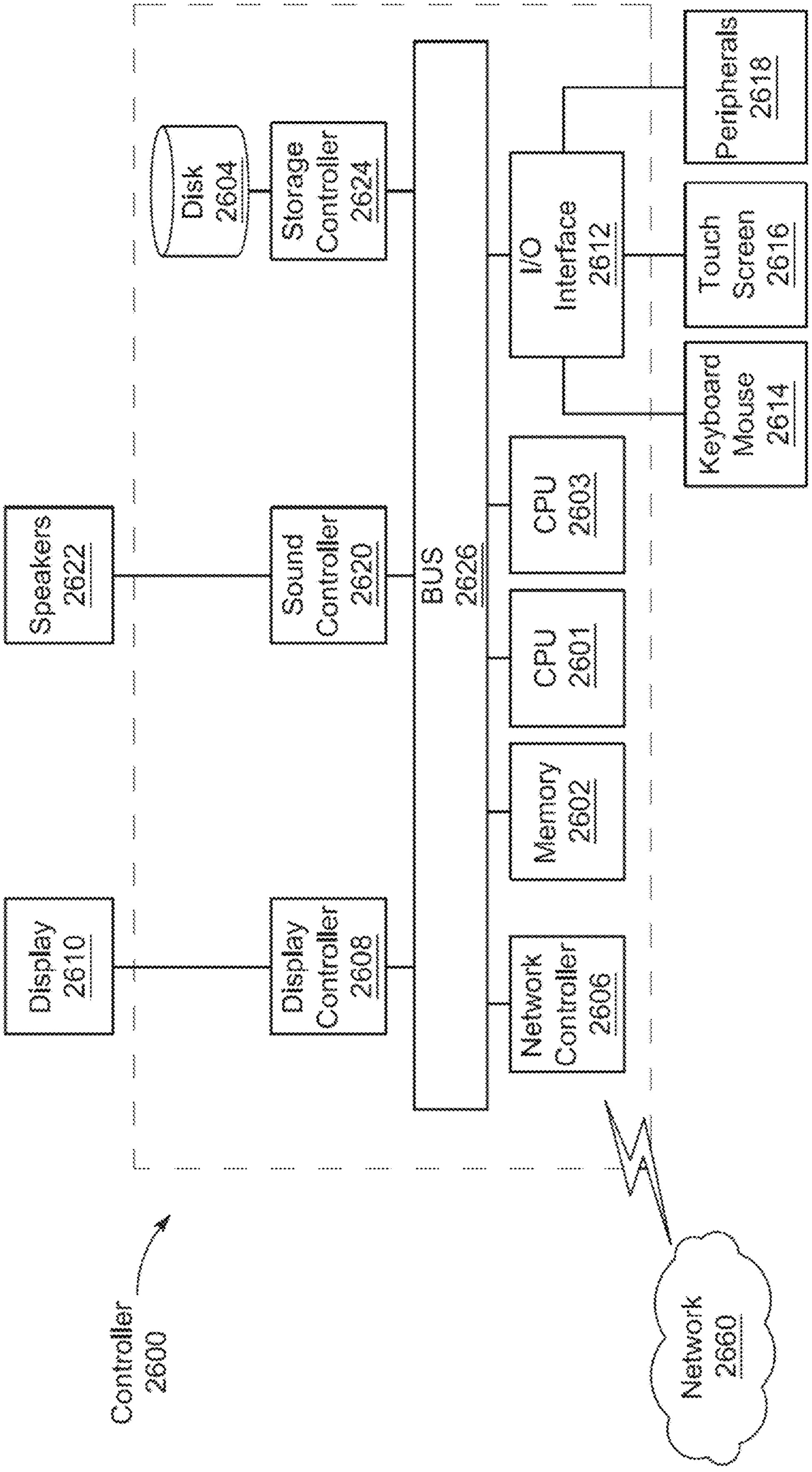
FIG. 16 is an illustration of a non-limiting example of details of computing hardware used in the computing system, according to an embodiment of the present disclosure.

Next, further details of the hardware description of the computing environment according to exemplary embodiments are described with reference to FIG. 16. In FIG. 16, a controller 2600 is described as representative of the system 600, 700 of FIGS. 6 and 7 in which the controller is a computing device which includes a CPU 2601 which performs the processes described above/below. The process data and instructions may be stored in memory 2602. These processes and instructions may also be stored on a storage medium disk 2604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk, or any other information processing device with which the computing device communicates, such as a server or computer.

Further, the claims may be provided as a utility application, background daemon, or component of an operating system, or combination thereof, executing in conjunction with CPU 2601, 2603 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 2601 or CPU 2603 may be a Xenon or Core processor from Intel of America or an Opteron processor from AMD of America, or may be other processor types that would be recognized by one of ordinary skill in the art. Alternatively, the CPU 2601, 2603 may be implemented on an FPGA, ASIC, PLD or using discrete logic circuits, as one of ordinary skill in the art would recognize. Further, CPU 2601, 2603 may be implemented as multiple processors cooperatively working in parallel to perform the instructions of the inventive processes described above.

The computing device in FIG. 16 also includes a network controller 2606, such as an Intel Ethernet PRO network interface card from Intel Corporation of America, for interfacing with network 2660. As can be appreciated, network 2660 can be a public network, such as the Internet, or a private network, such as a LAN or WAN network, or any combination thereof, and can also include PSTN or ISDN sub-networks. The network 2660 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 2608, such as a NVIDIA GeForce GTX or Quadro graphics adaptor from NVIDIA Corporation of America for interfacing with display 2610, such as a Hewlett Packard HPL2445w LCD monitor. A general purpose I/O interface 2612 interfaces with a keyboard and/or mouse 2614 as well as a touch screen panel 2616 on or separate from display 2610. General purpose I/O interface also connects to a variety of peripherals 2618 including printers and scanners, such as an OfficeJet or DeskJet from Hewlett Packard.

A sound controller 2620 is also provided in the computing device such as Sound Blaster X-Fi Titanium from Creative, to interface with speakers/microphone 2622 thereby providing sounds and/or music.

The general-purpose storage controller 2624 connects the storage medium disk 2604 with communication bus 2626, which may be an ISA, EISA, VESA, PCI, or similar, for interconnecting all of the components of the computing device. A description of the general features and functionality of the display 2610, keyboard and/or mouse 2614, as well as the display controller 2608, the storage controller 2624, the network controller 2606, sound controller 2620, and general purpose I/O interface 2612, is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 17.

Figure 17:
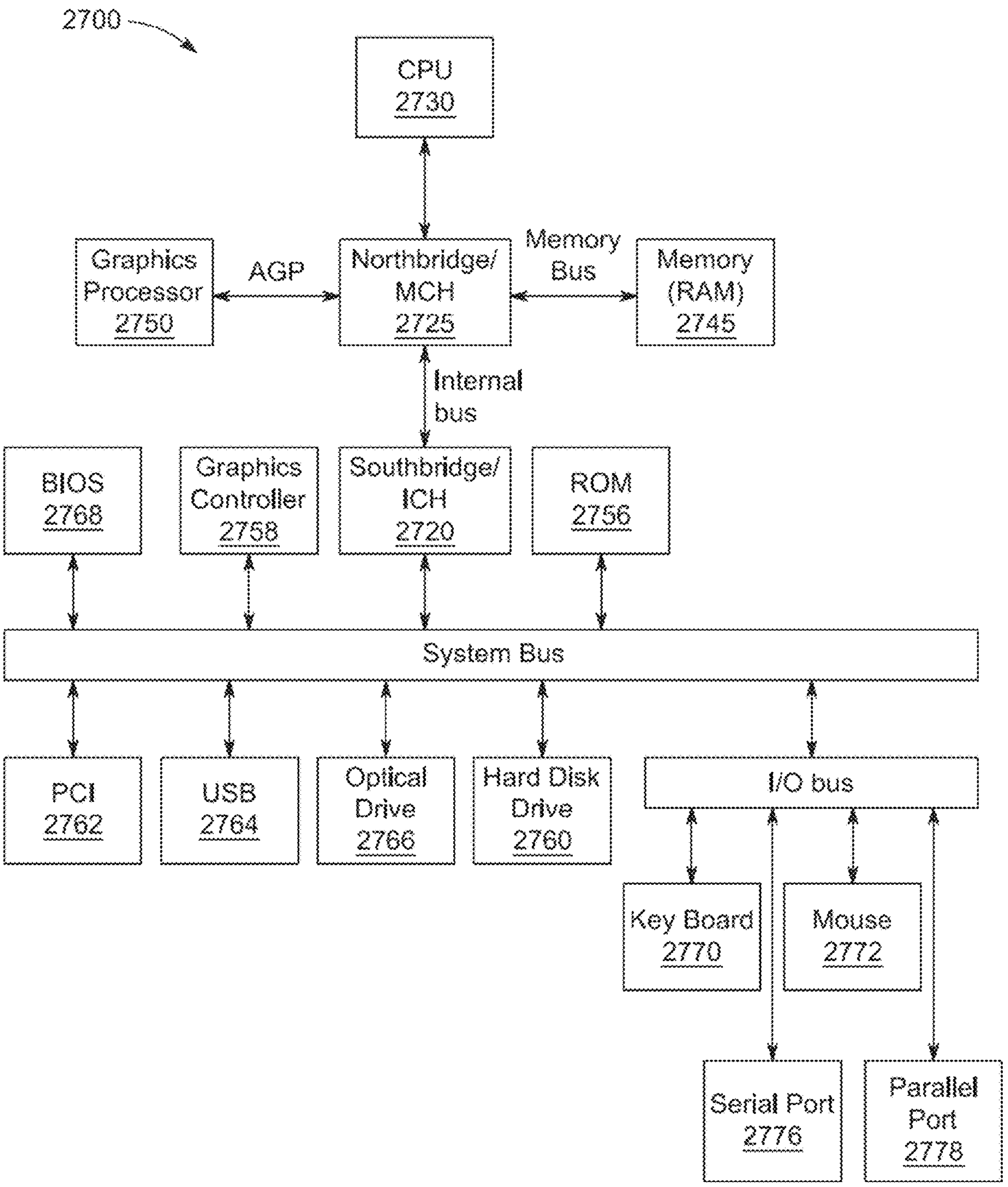
FIG. 17 is an exemplary schematic diagram of a data processing system used within the computing system, according to an embodiment of the present disclosure.

FIG. 17 shows a schematic diagram of a data processing system, according to certain embodiments, for performing the functions of the exemplary embodiments. The data processing system is an example of a computer in which code or instructions implementing the processes of the illustrative embodiments may be located.

In FIG. 17, the data processing system 2700 employs a hub architecture including a north bridge and memory controller hub (NB/MCH) 2725 and a south bridge and input/output (I/O) controller hub (SB/ICH) 2720. The central processing unit (CPU) 2730 is connected to NB/MCH 2725. The NB/MCH 2725 also connects to the memory 2745 via a memory bus and connects to the graphics processor 2750 via an accelerated graphics port (AGP). The NB/MCH 2725 also connects to the SB/ICH 2720 via an internal bus (e.g., a unified media interface or a direct media interface). The CPU Processing unit 2730 may contain one or more processors and even may be implemented using one or more heterogeneous processor systems.

Figure 18:
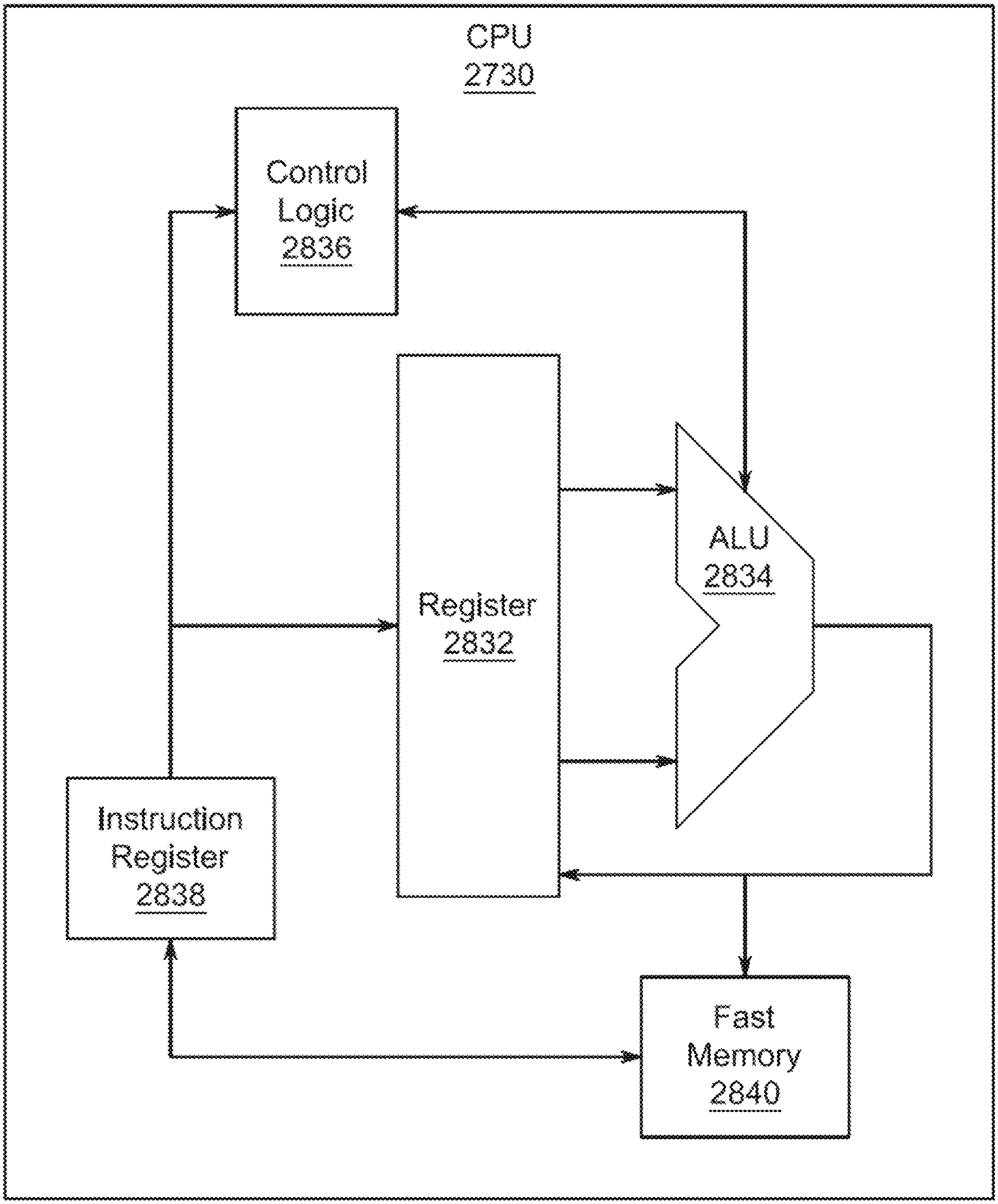
FIG. 18 is an exemplary schematic diagram of a processor used with the computing system, according to an embodiment of the present disclosure.

For example, FIG. 18 shows one implementation of CPU 2730. In one implementation, the instruction register 2838 retrieves instructions from the fast memory 2840. At least part of these instructions is fetched from the instruction register 2838 by the control logic 2836 and interpreted according to the instruction set architecture of the CPU 2730. Part of the instructions can also be directed to the register 2832. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using the arithmetic logic unit (ALU) 2834, which loads values from the register 2832 and performs logical and mathematical operations on the loaded values according to the instructions. The results from these operations can be feedback into the register and/or stored in the fast memory 2840. According to certain implementations, the instruction set architecture of the CPU 2730 can use a reduced instruction set architecture, a complex instruction set architecture, a vector processor architecture, and a very large instruction word architecture. Furthermore, the CPU 2730 can be based on the Von Neuman model or the Harvard model. The CPU 2730 can be a digital signal processor, an FPGA, an ASIC, a PLA, a PLD, or a CPLD. Further, the CPU 7230 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 17, the data processing system 2700 can include that the SB/ICH 2720 is coupled through a system bus to an I/O Bus, a read-only memory (ROM) 2756, universal serial bus (USB) port 2764, a flash binary input/output system (BIOS) 2768, and a graphics controller 2758. PCI/PCIe devices can also be coupled to SB/ICH 2720 through a PCI bus 2762.

The PCI devices may include, for example, Ethernet adapters, add-in cards, and PC cards for notebook computers. The Hard disk drive 2760 and CD-ROM 2766 can use, for example, an integrated drive electronics (IDE) or serial advanced technology attachment (SATA) interface. In one implementation the I/O bus can include a super I/O (SIO) device.

Further, the hard disk drive (HDD) 2760 and optical drive 2766 can also be coupled to the SB/ICH 2720 through a system bus. In one implementation, a keyboard 2770, a mouse 2772, a parallel port 2778, and a serial port 2776 can be connected to the system bus through the I/O bus. Other peripherals and devices that can be connected to the SB/ICH 2720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

Figure 19:
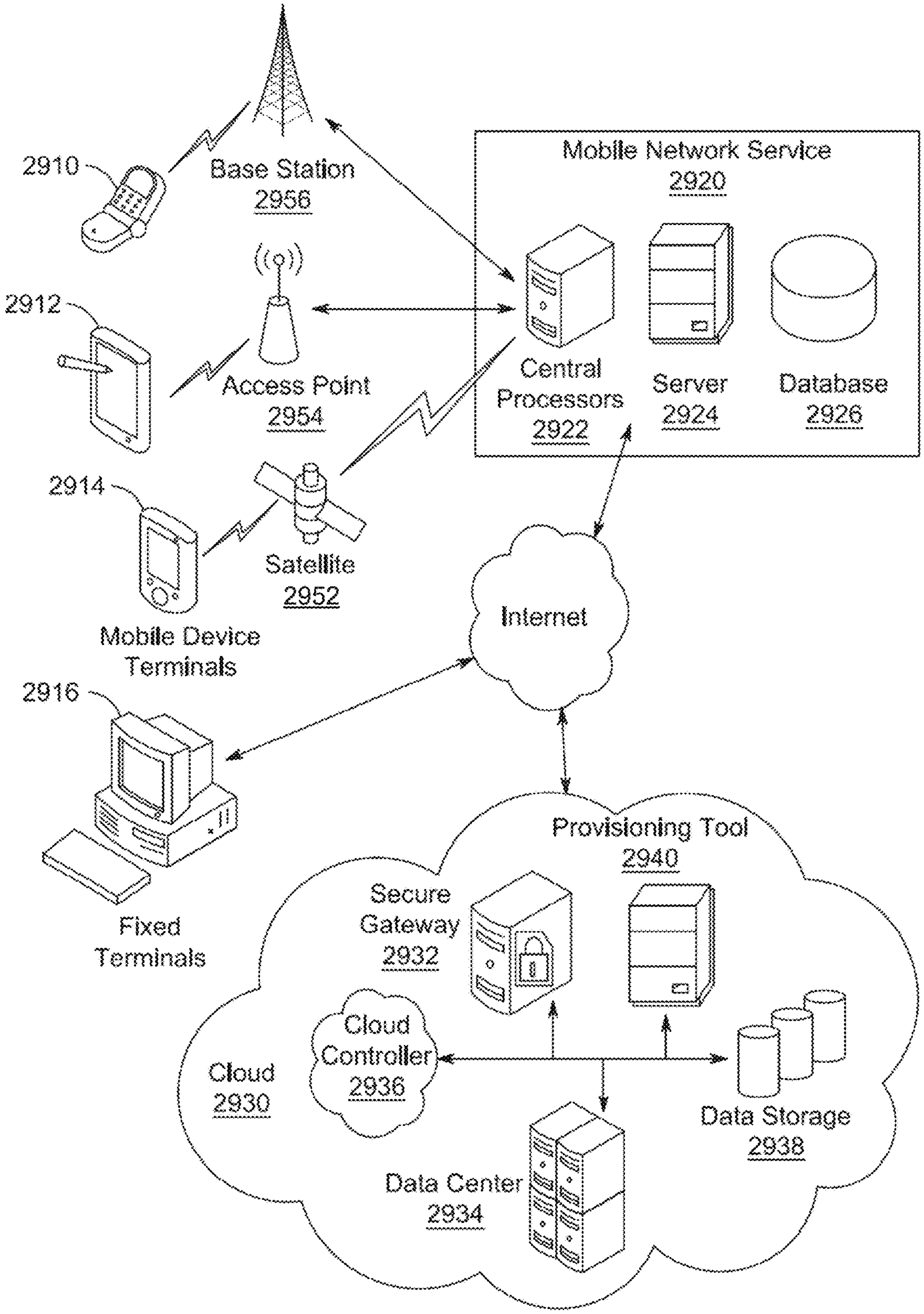
FIG. 19 is an illustration of a non-limiting example of distributed components that may share processing with the controller, according to an embodiment of the present disclosure.

The functions and features described herein may also be executed by various distributed components of a system. For example, one or more processors may execute these system functions, wherein the processors are distributed across multiple components communicating in a network. The distributed components may include one or more client and server machines, such as cloud 2930 including a cloud controller 2936, a secure gateway 2932, a data center 2934, data storage 2938 and a provisioning tool 2940, and mobile network services 2920 including central processors 2922, a server 2924 and a database 2926, which may share processing, as shown by FIG. 19, in addition to various human interface and communication devices (e.g., display monitors 2916, smart phones 2910, tablets 2912, mobile device terminals 2914). The network may be a private network, such as a LAN, satellite 2952, or access point 2954, or be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of the corresponding structure for performing the functionality described herein.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of operating a cooling system, comprising:
- obtaining data stream data including at least one of a weather data stream, a power grid data stream, a social network data stream, a satellite data stream, and a climate model data stream;
- obtaining historical data and buffering the historical data in a data buffer, the historical data including at least one of historical weather data, historical power grid data, historical social network data, historical satellite data, and historical climate model data;
- generating a multi-layered input dataset for feature extraction, based on the obtained data stream data and the historical data buffered in the data buffer;
- determining features from the multi-layered input dataset to generate collected feature data by:
  - selecting, for different data modalities represented in the multi-layered input dataset, corresponding deep-learning models from a plurality of deep-learning models, and
  - applying the corresponding deep-learning models to data of the multi-layered input dataset for the different data modalities to generate the collected feature data, the collected feature data including respective feature vectors for the different data modalities;
- determining patterns from the collected feature data to generate pattern data by:
  - projecting the feature vectors into a lower-dimensional latent-representation space to generate latent vector representations, and
  - generating the pattern data based on the latent vector representations;
- generating policy data based on the pattern data, the policy data including candidate setpoints for components of the cooling system, wherein the components of the cooling system include a chiller device and a district cooling storage device configured to store cooling capacity produced by the chiller device, and wherein the candidate setpoints include at least one of a chiller load level for the chiller device, a storage charge/discharge time for the district cooling storage device, a pump speed, a valve position, or a tank charging schedule;

determining a set of actions based on the policy data, wherein the set of actions include actions for operating the components of the cooling system according to the candidate setpoints;

transmitting the set of actions and the candidate setpoints to a proportional-integral-derivative (PID) controller; and operating, by the PID controller, the components of the cooling system according to the set of actions and to implement the candidate setpoints by controlling at least one of the chiller device according to the chiller load level, the district cooling storage device according to the storage charge/discharge time, a pump of the cooling system according to the pump speed, a valve of the cooling system according to the valve position, or the district cooling storage device according to the tank charging schedule.

2. The method of claim 1, wherein the determining the features from the multi-layered input dataset further comprises determining a data type of data in the multi-layered input dataset; and applying a feature extraction process corresponding to the data type of the multi-layered input dataset to generate a corresponding feature vector.

3. The method of claim 2, wherein the data type of the data in the multi-layered input dataset is time-series feature data and the corresponding feature extraction process is a time-series feature extraction process.

4. The method of claim 2, wherein the data type of the data in the multi-layered input dataset is geospatial feature data and the corresponding feature extraction process is a geospatial feature extraction process.

5. The method of claim 2, wherein the data type of the data in the multi-layered input dataset is text feature data and the corresponding feature extraction process is a text feature extraction process.

6. The method of claim 2, wherein the data type of the data in the multi-layered input dataset is weather feature data and the corresponding feature extraction process is a weather feature extraction process.

7. The method of claim 1, wherein the determining the patterns from the collected feature data further comprises:

determining interrelationships between the latent vector representations; and clustering the latent vector representations based on the determined interrelationships describing similarities between the latent vector representations to generate the pattern data.

8. The method of claim 1, wherein the generating the policy data further comprises generating confidence levels for a plurality of predictions generated from the pattern data;

generating an aggregate confidence level based on the generated confidence levels; and determining an uncertainty score based on the aggregate confidence level.

9. The method of claim 8, wherein the determining the set of actions based on the policy data further comprises determining whether the uncertainty score is above a predetermined threshold;

upon determining the uncertainty score is above the predetermined threshold, flagging the candidate setpoints as high risk and selecting a fallback rule-based policy including a set of pre-established actions as the set of actions.

10. The method of claim 1, wherein the data stream data is the weather data stream and the weather data stream includes at least one of air temperature data, relative humidity data, wind speed data, wind direction data, pressure data, global horizontal irradiance data, direct normal irradiance data, and diffuse horizontal irradiance data.

11. The method of claim 1, wherein the data stream data is the social network data stream and the social network data stream includes at least one of trends data, posts data, comments data, news data, and social graph data.

12. The method of claim 1, wherein the data stream data is the climate model data stream and the climate model data stream includes at least one of gridded data, geospatial data, climate events data, and ensemble forecasting data.

13. The method of claim 1, wherein the data stream data is the satellite data stream and the satellite data stream includes at least one of optical image data, thermal infrared imaging data, synthetic aperture radar data, and LIDAR data.

14. The method of claim 1, wherein the data stream data is the power grid data stream and the power grid data stream includes energy generation data, energy demand data, market and economic cost data, and maintenance schedule cost data.

15. The method of claim 1, wherein the transmitting the set of actions and the candidate setpoints further comprises transmitting, to the PID controller, a charge instruction, a charge start time, and a charge capacity endpoint for controlling the district cooling storage device.

16. The method of claim 15, wherein the district cooling storage device is an ice-based battery storage device or a chilled-water thermal storage device.

17. The method of claim 1, wherein the transmitting the set of actions and the candidate setpoints further comprises transmitting, to the PID controller, a discharge instruction, a discharge start time, and a discharge capacity endpoint for controlling the district cooling storage device.

18. The method of claim 1, wherein the transmitting the set of actions and the candidate setpoints further comprises transmitting, to the PID controller, a load adjustment instruction and a target chiller load level a for controlling the chiller device.

19. The method of claim 1, wherein the determining the set of actions based on the policy data further comprises applying a penalty to actions corresponding to a fossil fuel-based energy source.

20. The method of claim 1, further comprising monitoring for changes to the obtained data stream data;

determining updated features based on the changes in the obtained data stream data;

determining updated patterns based on the changes in the collected feature data; and generating updated policy data including updated candidate setpoints based on the changes in the updated pattern data.

* * * * *